United States Patent
Cavalli et al.

(10) Patent No.: US 7,224,977 B2
(45) Date of Patent: May 29, 2007

(54) COMMON RADIO RESOURCE MANAGEMENT METHOD IN A MULTI-RAT CELLULAR TELEPHONE NETWORK

(75) Inventors: Simona Cavalli, Ispra (IT); Francesco Meago, Sondrio (IT)

(73) Assignee: Siemens Mobile Communications S.p.A., Milan (IT)

( * ) Notice: Subject to any disclaimer, the term of this patent is extended or adjusted under 35 U.S.C. 154(b) by 167 days.

(21) Appl. No.: 10/884,924

(22) Filed: Jul. 7, 2004

(65) Prior Publication Data
US 2005/0026616 A1   Feb. 3, 2005

(30) Foreign Application Priority Data
Jul. 31, 2003   (EP)   ................... 03425514

(51) Int. Cl.
H04Q 7/20   (2006.01)
H04Q 7/00   (2006.01)
H04L 12/66  (2006.01)

(52) U.S. Cl. ............... 455/452.1; 455/452.2; 370/352; 370/329

(58) Field of Classification Search ............ 455/452.1, 455/422.1, 414.1, 553.1, 522, 452.2; 370/352, 370/329
See application file for complete search history.

(56) References Cited

U.S. PATENT DOCUMENTS

| | | | |
|---|---|---|---|
| 6,377,817 B1 * | 4/2002 | Hakaste et al. ......... | 455/553.1 |
| 6,618,591 B1 * | 9/2003 | Kalliokulju et al. ..... | 455/452.2 |
| 6,748,211 B1 * | 6/2004 | Isaac et al. ............. | 455/414.1 |
| 2002/0142749 A1 * | 10/2002 | Muniere et al. .......... | 455/403 |
| 2002/0191556 A1 * | 12/2002 | Krishnarajah et al. ..... | 370/329 |
| 2003/0081592 A1 * | 5/2003 | Krishnarajah et al. ..... | 370/352 |
| 2003/0207696 A1 * | 11/2003 | Willenegger et al. ...... | 455/522 |
| 2004/0009767 A1 * | 1/2004 | Lee et al. ................ | 455/422.1 |

FOREIGN PATENT DOCUMENTS

WO   WO01/31963 A1   5/2001
WO   WO02/32160 A2   4/2002

OTHER PUBLICATIONS

XP-002270684; 3GPP TR 25.881 V5.0.0 (Dec. 2001) prop. technical report; 3rd generation partnership project; technical specification group radio access network; improvement of RRM across RNS and RNS/BSS (Release 5); 3GPP, 650 Route des Lucioles-Sophia Antipolis; FR-Valbonne.

* cited by examiner

*Primary Examiner*—Joseph Feild
*Assistant Examiner*—Kiet Doan

(57) ABSTRACT

A Common radio resource management method is performed in a mobile radio communication network employing different radio access technologies that overlap over a geographic area subdivided into cells belonging to the domains of respective controllers which are connected to each other in overlapping or adjacent domains and to a core network by means of relevant interfaces. The controllers calculate new traffic-related Information Elements to be exchanged over the existing interfaces to the aim of planning handovers and/or cell reselections towards adjacent cells either of the same or different RAT. Cell capabilities and mobile terminal capabilitiess being also specified by respective IEs. Diversely from the conventional traffic-related IEs based on Cell Load parameters or Free Capacity, the new IEs include indications of the "availability" of bearer services in the cell in terms of maximum bitrate, either guaranteed or not guaranteed, that can currently be allowed to each bearer service.

14 Claims, 12 Drawing Sheets

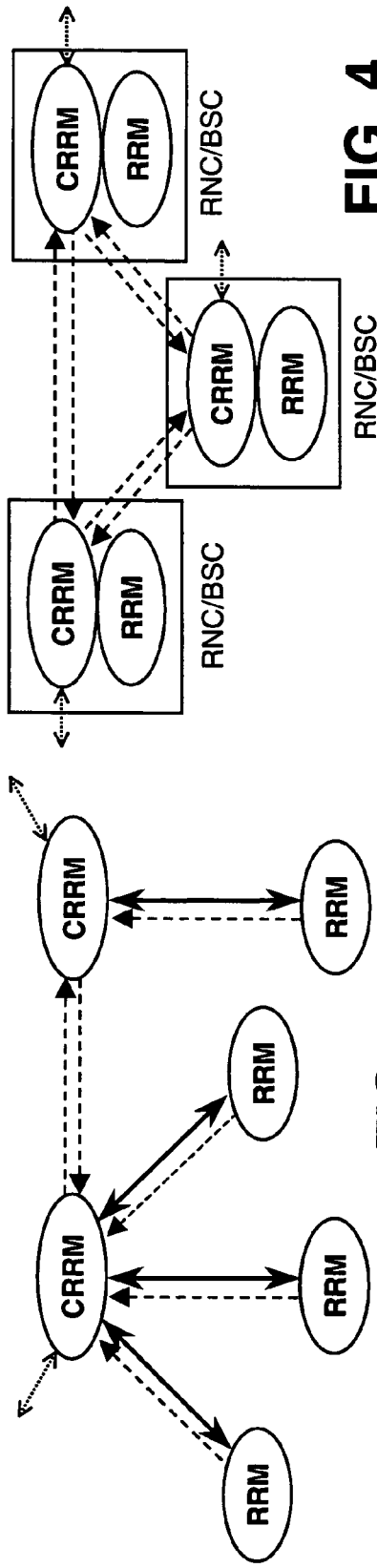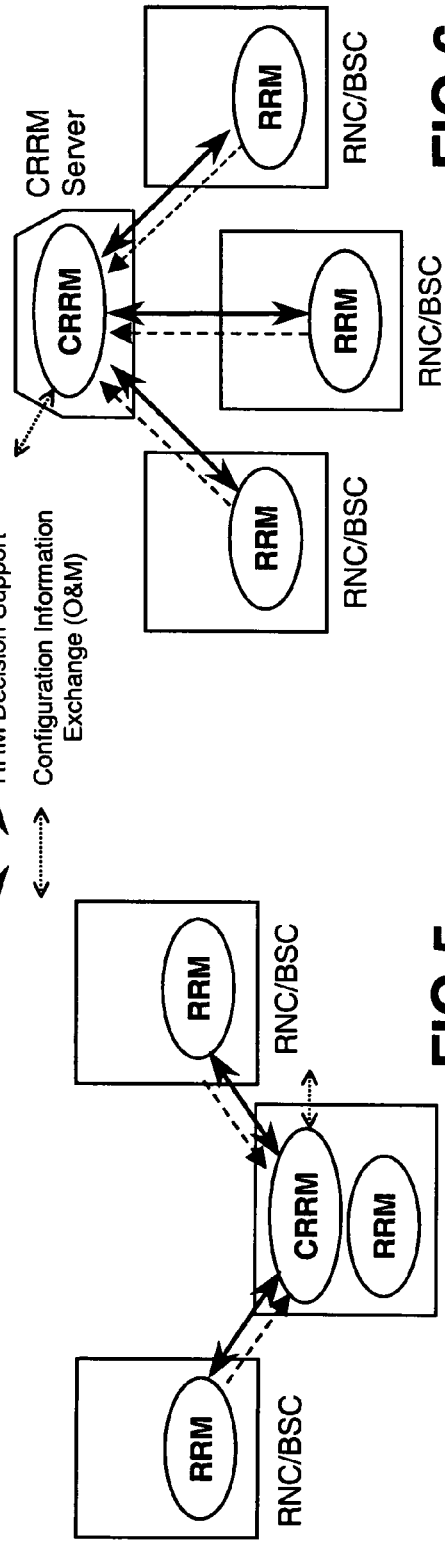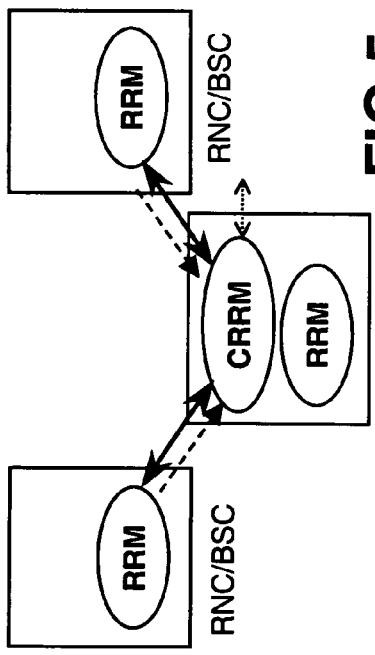

REFERENCE NETWORK WITH SRNC SERVING AND NEIGHBOUR CELL

COMMON RADIO RESOURCE MANAGEMENT METHOD IN A MULTI-RAT CELLULAR TELEPHONE NETWORK

FIELD OF THE INVENTION

The present invention relates to the field of Public Land Mobile Networks (PLMN) and more precisely to a Common Radio Resource Management (CRRM) method in a multi-RAT cellular telephone network. For the aim of the following disclosure a list of the most relevant acronyms and a brief functional description is included in APPENDIX 6.

BACKGROUND ART

With the introduction of $3^{rd}$ Generation UMTS (Universal Mobile Telecommunication System) systems the multi-RAT (Radio Access Technology) opportunities will be put in foreground. The former $2^{rd}$ Generation PLMN (Public Land Mobile Network) includes: GSM 900 MHz, DCS 1800 MHz (Digital Cellular System), GSM EDGE (Enhanced Data rates for GSM Evolution), GPRS (General Packet Radio Service); PCS (Personal Communication System), etc. In the new $3^{rd}$ Generation UMTS two CDMA radio access techniques have been defined, respectively known as: TDD (Time Division Duplex) UTRA (UMTS Terrestrial Radio Access), in which transmission directions are distinguished in the time domain, and FDD (Frequency Division Duplex) UTRA, in which transmission directions are distinguished in the frequency domain. The FDD UTRA is used by the WCDMA (Wide band Code Division Multiple Access) system. The TDD UTRA technique foresees in its turn two options: HCR (High Chip Rate) TDD at 3.84 Mcps, and LCR (Low Chip Rate) TDD at 1.28 Mcps. The Applicant and CWTS (Chinese Wireless Telecommunication Standards) committee are furthermore engaged in the development of a TD-SCDMA (Time Division—Synchronous Code Division Multiple Access), standard which is based on the 3GPP 1.28 Mcps TDD physical layer and on the reuse of the GSM-GPRS higher layer functions and procedures, offering the operators a technology able to run on most of the deployed GSM network elements.

Both $2^{nd}$ and $3^{rd}$ Generation PLMNs are standardized by international authorities whose aim is that of making the operation of the systems of the various manufacturers each other compatible. In particular, GSM had been described in the relevant Technical Reports (TR) issued by the Special Mobile Group (SMG) of the European Telecommunications Standards Institute (ETSI), while UMTS is described in the Technical Specifications (TS) issued by the 3rd Generation Partnership Project (3GPP) in the ambit of the ITU-T (International Telecommunication Union). At the time of writing, the SMG does not exist anymore and the related GSM work has been taken over by 3GPP that incorporate standardisation of both GSM and UMTS systems.

FIG. 1 shows a multi-RAT (Radio Access Technology) PLMN that will be soon completed in Europe. The new Universal Mobile Telecommunications System (UMTS) shares the existing GSM (Global System for Mobile communications) Core Network CN with the GPRS service. Relevant GSM RAN (Radio Access Network) in FIG. 1 is the so-called GERAN (GSM EDGE RAN), corresponding to the ultimate GSM RAN based on new EDGE (Enhanced Data rates for GSM Evolution) techniques that allow higher data rates in GSM, e.g. higher modulations. The Core Network CN is connected to one or more BSS (Base Station Subsystem) of the GSM, and to one or more RNS (Radio Network Subsystem) of an UTRAN (Universal Terrestrial Radio Access Network). The UMTS system of FIG. 1 is described in the TS 23.002 (CN) and TS 25.401 (UTRAN). Both the UTRAN and BSS are connected, on air, to a plurality of User Equipment UE/MS, each including a Mobile Equipment ME with a respective USIM card (UMTS Subscriber Identity Module). The present invention applies to UEs of single but preferably multistandard type: so that they are indicated as UE/MS (without limitation, often the only term UE is indicated). The UTRAN includes a plurality of Node B blocks each connected to a respective Radio Network Controller RNC by means of an Iub interface. A node B includes a Base Transceiver Station BTS connected to the UEs through an on-air Uu interface. The upper RNC is a Serving S-RNC connected to the Core Network CN by means of a first Iu(CS) interface for Circuits Switched and a second Iu(PS) interface for Packet Switched of the GPRS. It is also connected to an Operation and Maintenance Centre (OMC). The RNC placed below can be a Drift D-RNC and is connected to the upper S-RNC by means of an Iur interface. The UTRAN with the served UEs constitute a Radio Network Subsystem (RNS) disclosed in TS 23.110.

The GSM-BSS block includes a plurality of BTSs connected to a Base Station Controller BSC by means of an Abis Interface and to the UEs through an on-air Um interface. The BSC is interfaced to the Core Network CN by means of a Gb interface (packet switched) and is further connected to a Transcoder and Rate Adaptor Unit TRAU also connected to the Core Network CN through an A interface. It is also connected to an Operation and Maintenance Centre (OMC).

The CN network includes the following Network Elements: Switching Centre MSC/Visitor Location Register VLRi, Gateway MSC GMSC, Interworking Function IWF/Transcoder TC, Camel Service Environment CSE, Equipment Identity Register EIR, Home Location Register HLR, Authentication Centre AuC, Serving GPRS Support Node SGSN, and Gateway GPRS Support Node GGSN. The following interfaces are visible inside the CN block: A, E, Gs, F, C, D, Gf, Gr, Gc, Gn, and Gi. The IWF block translates the Iu(CS) interface into the A interface towards MSC/VLR block. The TC element performs the transcoding function for speech compression/expansion concerning UTRAN (differently from GSM where this function is performed outside the CN network) also connected to the MSC block through the A interface. The GMSC is connected to the MSC/VLR through the E interface and to a Public Switched Telephone Network PSTN and an Integrated Services Digital Network ISDN. Blocks CSE, EIR, HLR, AUC are connected to the MSC/VLR through, in order, the Gs, F, C, and D interfaces, and to the SGSN node through the Gf and Gr interfaces. The SGSN block is interfaced at one side to the S-RNC inside UTRAN block by means of the Iu(PS) interface, and to the BSC inside the GSM-BSS block through the Gb interface. At the other side the SGSN node is interfaced to the GGSN node through the Gn interface. The last block is connected through the Gi interface to a packet data switching network of the IP (Internet Protocol) type and/or the X.25 type. The Core Network CN of FIG. 1 consists of an enhanced GSM Phase 2+, as described in TS 23.101, with a Circuit Switched CS part and a packet Switched part (GPRS). Another important Phase 2+ is the CAMEL (Customised Application for Mobile network Enhanced Logic) Application Part (CAP) used between the MSC and CSE for Intelligent Network (IN) applications. CAP is described in TS 29.078.

In operation, the MSC, so as the SGSN node, keep records of the individual locations of the mobiles and performs the safety and access control functions. More BSS and RNS blocks are connected to the CN Network, which is able to perform intrasystem handovers between adjacent RNSs or between adjacent BSSs, and intersystem handovers between a RNS and an adjacent BSS. UTRAN in respect of GSM further improves data service by making possible greater throughputs and the asymmetrical traffic typical of the Internet Protocol (IP). The network of FIG. 1, which only represents a minimal part of a world-wide network, shall allow the routing of a telephone call inside an International UMTS/GSM Service Area subdivided into National Service Areas. By way of the hierarchical structure of the network, each National Service Area is subdivided into the following nested domains of decreasing area: PLMN Service Area; MSC/SGSN Service Area; Location Area LA (CS-domain) uniquely defined by its LAI (Location Area Identity) code; Routing Area RA inside the SGSN Service Area as a partition of the CS Location Area; Cell Area where the UE is actually located in the radio coverage of a target Node B or BTS.

Many protocols are deputed to govern the exchange of information at the various interfaces of the multi-RAT network of FIG. 1. These protocols are largely based on the Open System Interconnection (OSI) Reference Model for CCITT (Comité Consultatif International Télégraphique et Téléphonique) Applications (Rec. X.200). The OSI model is partitioned into seven layers. From the point of view of a particular layer, the adjacent lower layer provides a "transfer service" with specific features. The way in which the lower layer is realised is immaterial to the next higher layer. Correspondingly, the lower layer is not concerned with the meaning of the information coming from the higher layer or the reason for its transfer. Historically the problem of designing a well reliable signalling system has been posed in the PSTNs domain. For this aim a CCITT Signalling System N° 7 has been developed to provide an internationally standardised general purpose Common Channel Signalling (CCS) system. CCS is a signalling method in which a single channel conveys, by means of labelled messages, signalling information relating to, for example, a multiplicity of circuits, or other information such as that used for network management. Common Channel Signalling can be regarded as a form of data communication that is specialised for various types of signalling and information transfer between processors in telecommunications networks. The signalling system uses signalling links for transfer of signalling messages between telephone exchanges or other nodes in the telecommunication network served by the system. Relevant SS7 standards are published, and regularly updated, as ITU-T Q.7xx Recommendations. SS7 signalling as been gradually enriched with new functions suitable for the incoming digital PLMNs, the Intelligent Networks, and the Packet Switch service. To support PLMNs, a Mobile Application Part (MAP) has been developed by ETSI. MAP (TS 29.002) is the most important Level 4 Application Part, because it regulates the mobility aspects of the users. Typical MAP functions are, e.g.: store routing information in the HLR register, update and clear VLR location information, delivery & updating user profiles in the HLR and VLR, IMEI (International Mobile Equipment Identity) check, Inter-MSC handover, etc.

The general protocol architecture of the signalling used in the network includes an Access Stratum with a superimposed Non-Access Stratum (NAS). The Access Stratum includes Interface protocols and Radio protocols for exchanging User data and control information between the CN and the UE. These protocols contain mechanisms for transferring NAS messages transparently, i.e. the so-called Direct Transfer DT procedures. The NAS stratum includes higher level protocols to handle control aspects, such as: Connection Management CM, Mobility Management MM, GPRS Mobility Management GMM, Session Management SM, Short Message Service SMS, etc. Said general protocol architecture is designed in horizontal layers and vertical planes, taken as logically independent of each other. At the various RAT interfaces, two main horizontal layers are present: an upper Radio Network Layer and a lower Transport Network Layer, in the latter the Physical Layer corresponding to the Level 1 is present. Three vertical planes are generally present, respectively: a Control Plane, a User Plane and a Transport Network Control Plane. The User Plane includes the Data Stream(s) and the data Bearer(s) for the Data Stream(s). Each data stream is characterised by one or more frame protocols specified for those interfaces. The User Plane is used to transport all user data, e.g.: speech data or packet data. The Control Plane includes several Application Protocols used for all control signalling which is procedure specific. The Control Plane also includes the Signalling Bearer(s) for transporting the Application Protocol messages. The Transport Network Control Plane is used for all control signalling within the Transport Network Layer; it does not contain any Radio Network Layer information. The Transport Network Control Plane acts as plane between the Control Plane and the User Plane, it enables the Application Protocols in the Control Plane to be totally independent from the technology selected for data bearer in the User Plane. The Layer 1 functions are the ones that interface to the physical medium (e.g.: optical fibre, radio link, copper cable) to offer the clock extraction capability and transmission quality control. The physical medium shall comply with some well known standards, i.e. SDH, SONET, Ex, Tx, etc. The ATM (Asynchronous Transfer Mode) is used on Layer 2 of the UTRAN's Transport Network Layer; to say, for all 3 Planes of the Iu (TS 25.412), Iur (TS 25.422) and Iub (TS 25.432) interfaces. The ATM mode enables the transmission of Real Time (RT) data, such as speech & video, as well as Non-Real Time (NRT) data, such as packet data, computer files and graphics.

FIG. 2 shows the main protocol stacks of the CS and PS Control Plane referred, without limitation, to the only UMTS network of FIG. 1. A similar figure exists even for the GSM part. At the bottom of FIG. 2 the following elements: UE, Node B, D-RNC, S-RNC, CN and the respective interfaces Uu, Iub, Iur, Iu [Iu(CS), Iu(PS)] are depicted. The bottom part of the Control Plane includes the Transport Layer upon which the Radio Protocols and the protocols of the Non Access Stratum reside. The Transport Layer includes the elements of the Transport Network Layer, to say: the L1 and L2 layers and an Access Link Control Application Part (ALCAP). The NAS protocols are also indicated in FIG. 2. With reference to FIG. 2, the Transport Plane on the Uu interface is the same as described in the User Plane, it consists of Level 1 UTRA FDD or TDD mode and Level 2 protocols MAC (Medium Access Control) and RLC (Radio Link Control). The Transport Plane on the Iub, Iur and Iu interfaces again consists of the same Level 1 as described in the User Plane. ATM and AAL1-3 are used as Layer 2 signalling protocols, in particular the ALCAP application part. The indicated Radio Protocols are the following: RRC (Radio Resource Protocol), NBAP (Node B Application Part), RNSAP (Radio Network Subsystem Application Part), RANAP (Radio Access Network Application Part). In operation, RRC is used as Layer 3 protocol for controlling the information transfer between UE and UTRAN. RRC messages carry all the information required to set-up, modify, or release Radio Links (RL), which carry in their payload higher layer NAS signalling and enable UE mobility in RRC Connected mode. NBAP is used as Layer 3 protocol on the Iub interface. It carries common signalling or dedicated signalling between C-RNC and Node Bs. RNSAP is used as Layer 3 protocol on the Iur interface. It supports basic inter-RNC mobility and DCH traffic, as well as CCH traffic transmission. RANAP is used as Layer 3 protocol on the Iu interface. It is used for signalling between UTRAN and the Core network CN. RANAP is responsible on Iu for e.g.: Paging, RAB (Radio Access Bearer) management, S-RNC relocation, security and overload control, and the NAS signalling transfer. The indicated NAS Protocols are the following: MM (Mobility Management), GMM (GPRS MM), SM (Session Management), and CM (Connection Management). MM supports function such as: UE attach/detach, security functions, and location/routing area updates. SM supports Packet Data Protocol (PDP) context activation/de-activation for PS connections. CM is used for Circuit Switched Call Control, Supplementary Services, and SMS support. Besides RANAP and RRC contain Direct Transfer procedures for transparent NAS message transfer between UEs and the Core Network CN.

The main purpose of the network of FIG. 1 is that to route speech signals and packet data among different points of a wide geographical network assuring in the meanwhile the possibly best Quality of Service (QoS) to the end user. QoS is an important aspect of the GSM and UMTS specification, consequently. To reach a prefixed QoS a lot of parameters are continuously measured and the measures reported to the various entities involved in this task, both for uplink and downlink. In the following some examples of QoS concepts are given for GPRS and UMTS. GPRS QoS is specified in TS 22.060 (former GSM 02.60) and TS 23.060 (former GSM 03.60). An individual QoS profile is associated with each PDP (Packet Data Protocol) context. The QoS profile is considered to be a single parameter with multiple data transfer attributes. It defines the quality of service expected in terms of the following attributes:
precedence class,
delay class,
reliability class,
peak throughput class, and
mean throughput class.

There are many possible QoS profiles defined by the combinations of the attributes. A PLMN may support only a limited subset of the possible QoS profiles. During the QoS profile negotiation defined in subclause "Activation Procedures", it shall be possible for the MS (Mobile Station, presently considered as the UE) to request a value for each of the QoS attributes, including the HLR-stored subscribed default values. The network shall negotiate each attribute to a level that is in accordance with the available GPRS resources. The network shall always attempt to provide adequate resources to support the negotiated QoS profiles.

The service precedence class indicates the relative importance of maintaining the service commitments under abnormal conditions, for example which packets are discarded in the event of problems such as limited resources or network congestion. The precedence classes are defined in High, Medium, and Low priority.

The delay class defines the maximum values for the mean delay and 95-percentile delay to be incurred by the transfer of data through the GPRS network(s). The delay parameter defines the end-to-end transfer delay incurred in the transmission of SDUs (Service Data Unit) through the GPRS network(s). This includes the radio channel access delay (on uplink) or radio channel scheduling delay (on downlink), the radio channel transit delay (uplink and/or downlink paths) and the GPRS-network transit delay (multiple hops). It does not include transfer delays in external networks. Four delay classes exist. As a minimum the PLMN shall support the best effort delay class 4.

The reliability class defines the probability of loss of, duplication of, mis-sequencing of, or corruption of SDUs.

The peak throughput is measured in units of octets per second. It specifies the maximum rate at which data is expected to be transferred across the network for an individual PDP context. There is no guarantee that this peak rate can be achieved or sustained for any time period, this depends upon the MS capability and available radio resources. The network may limit the subscriber to the negotiated peak data rate, even if additional transmission capacity is available. The peak throughput is independent of the delay class, that determines the per-packet GPRS network transit delay.

The mean throughput is measured in units of octets per hour. It specifies the average rate at which data is expected to be transferred across the GPRS network during the remaining lifetime of an activated PDP context. The network may limit the subscriber to the negotiated mean data rate (e.g., for flat-rate charging), even if additional transmission capacity is available. A "best effort" mean throughput class may be negotiated, and means that throughput shall be made available to the MS on a per need and availability basis.

UMTS QoS is specified in TS 23.107. There are four different QoS classes:
conversational class;
streaming class;
interactive class; and
background class.

The main distinguishing factor between these QoS classes is how delay sensitive the traffic is: Conversational class is meant for traffic which is very delay sensitive while Background class is the most delay insensitive traffic class.

Conversational class mainly regards telephony speech (e.g. GSM). But with Internet and multimedia a number of new applications will require this scheme, for example voice over IP and video conferencing tools. The maximum transfer delay is given by the human perception of video and audio conversation. Therefore the limit for acceptable transfer delay is very strict, as failure to provide low enough transfer delay will result in unacceptable lack of quality. The transfer delay requirement is therefore both significantly lower and more stringent than the round trip delay of the interactive traffic case.

Streaming class is characterised by that the time relations (variation) between information entities (i.e. samples, packets) within a flow shall be preserved, although it does not have any requirements on low transfer delay. As the stream normally is time aligned at the receiving end (in the user equipment), the highest acceptable delay variation over the transmission media is given by the capability of the time alignment function of the application. Acceptable delay variation is thus much greater than the delay variation given by the limits of human perception.

Interactive class is applied when the end-user, that is either a machine or a human, is on line requesting data from remote equipment (e.g. a server). Examples of human interaction with the remote equipment are: web browsing, data base retrieval, server access. Examples of machines interaction with remote equipment are: polling for measurement records and automatic data base enquiries (tele-machines). Interactive traffic is the other classical data communication scheme that on an overall level is characterised by the request response pattern of the end-user. At the message destination there is an entity expecting the message (response) within a certain time. Round trip delay time is therefore one of the key attributes. Another characteristic is that the content of the packets shall be transparently transferred (with low bit error rate).

Background class is applied when the end-user, that typically is a computer, sends and receives data-files during background processing. Examples are background delivery of E-mails, SMS, download of databases and reception of measurement records. Background traffic is one of the classical data communication schemes that on an overall level is characterised by that the destination is not expecting the data within a certain time. The scheme is thus more or less delivery time insensitive. Another characteristic is that the content of the packets shall be transparently transferred (with low bit error rate).

These classes can be grouped as groups of RT (real time) and NRT (non-real time) services, for example: RT traffic corresponds to the Conversational and Streaming traffic classes, while NRT traffic corresponds to the Interactive and Background traffic classes. Separated uplink and downlink values are considered for the services. Uplink is intended for transmissions from the UE to the Node B, or from the MS to the BTS. Downlink is intended the contrary direction of transmission.

In the scope of a Common Radio Resource Management (CRRM), current GSM and UMTS systems are allowed to exchange cell capacity and load information among RNCs/BSCs.

In the currently standardised Rel5 solution in RNSAP (TS 25.423 v5.6.0) and RANAP (TS 25.413 v5.4.0), the following Information Elements (IEs) concerning GSM and UMTS cells are specified and transferred among RNC/BSCs. We refer here for example to the definitions contained in RNSAP, that are nevertheless reflected in RANAP:

Cell Capacity Class Value: in order to compare the capacity available for user traffic within a cell among different operators' cells. Divided in two values (one for uplink, one for downlink): range: [1 . . . 100].

Load Value: in order to indicate the total load in the cell, as a percentage of the capacity indicated by the Cell Capacity Class Value. Divided in two values (one for uplink, one for downlink): range: [0 . . . 100].

RT Load Value: in order to indicate the load percentage due to RT services relative to the Load Value. Divided in two values (one for uplink, one for downlink): range: [0 . . . 100]. The NRT Load Value is not explicitly defined in the specification because directly obtainable by 100 minus RT Load.

NRT Load Information [0 . . . 3]. The abovementioned NRT Load Value [0 . . . 100] was not felt as sufficient, because of the characteristics of NRT traffic, that can tolerate delays and non continuous transmissions. It was therefore decided to also define an Uplink/Downlink NRT Load Information, where the different values have the following meaning:

0: Low,
1: Medium,
2: High: the probability to admit a new user is low,
3: Overloaded: the probability to admit a new user is low, packets are discarded and the source is recommended to reduce the data flow.

The goal of the Cell Capacity Class Value would be to allow e.g. the RNC that receives this indication to figure out (by combining this information with the load values) whether there is still free capacity in the cell or not, in order to decide whether the cell can be considered as a potential target cell for handover or not.

Coming to the description of the procedures that are used by the current Rel5 solution for the transfer of said IEs, a few different means are foreseen:

between RNCs on the Iur interfaces by usage of the "Common measurement" procedure (for Load Value, RT Load Value and NRT Load Information IEs) and the "Information Exchange" procedure (for the Cell Capacity Class IE), on the Iur-g interface between an RNC and a BSC, and between BSCs by using the same Iur procedures.

between GERAN and UTRAN, and in particular between an RNC and an A/Gb-mode-only BSC, by attaching the load information onto existing inter-RNC/BSC handover/relocation messages, between A/Gb mode BSCs by attaching the load information onto existing inter-RNC/BSC handover/relocation messages.

A Work Item on improvements of CRRM methods is the subject of the following 3GPP TR 25.891, titled: "Improvement of RRM across RNS and RNS/BSS (Release 6)". In this document a functional model is proposed in which the whole set of radio resources for an operator is considered to be partitioned into "radio resource pools". Making reference to FIG. 3, these radio resource pools are controlled by two different types of functional entities:

RRM entity: functional entity responsible for Radio Resource Management of one radio resource pool, i.e. this characterises the radio resource pool;

CRRM entity: functional entity responsible for a Common Radio Resource Management, i.e. coordination of overlapping/neighbour radio resource pools controlled by different RRM entities. This new CRRM entity is introduced to allow some kind of coordination among different radio resource pools whose radio resources are linked to the same geographic area in the network.

Interfaces and functions are foreseen between a CRRM entity and one or more RRM entities and between two CRRM entities, but not between two RRM entities directly. Information on other systems (e.g. inter system measurements GSM/UTRAN) can be retrieved through either the Core Network interfaces or the Iur-g interface between RNC and BSC. The functional relationships between the entities of the functional model are based on two types of functions: Reporting Information and RRM Decision Support. Interactions of CRRM and RRM with O&M (Operation and Maintenance) for the exchange of configuration information are possible. With reference to the FIGS. 4, 5, and 6 the following CRRM topologies are provided:

1. CRRM integrated into every RNC/BSC (FIG. 4);
2. CRRM integrated only in some RNC/BSCs (FIG. 5);
3. CRRM as a stand-alone server (FIG. 6).

The approach illustrated in FIG. 4 is characterised by the co-location of RRM and responsible CRRM entities. The functional interface between RRM and CRRM is not realised as an open interface in this solution. Only "Reporting Information" is exchanged over open interfaces. The depicted solution is the base of the current Rel5 solution, allowing to transfer cell capacity and load information among RNCs and BSCs using the information exchange/common measurement procedures via the Iur and Iur-g interfaces, or handover/relocation procedures via A/Iu interfaces. Only "Reporting Information" function on the interface between different CRRM entities is standardised (mainly as a cell load exchange). The "Reporting Information" function between CRRM and RRM entities and the "RRM Decision Support" is vendor specific since the CRRM entity must be integrated in every RNC/BSC which has to support CRRM. The approach illustrated in FIG. 5 is characterised by the co-location of CRRM with RRM for only one RNC/BSC. This integrated solution is allowing for open interfaces between RRM and CRRM (for the cases where RRM is not co-located with CRRM). The approach illustrated in FIG. 6 implements RRM and CRRM entities into separate nodes. All of the interfaces among RRMs and CRRMs are open.

Thanks to the different topologies of the FIGS. 3–6 an effective CRRM policy based approach is possible for load management. The introduction of an open interface between CRRM and both RNS and BSS allows the collection of traffic load information from several RNCs/BSCs for the aim of taking optimal decisions concerning Handovers and, in an equivalent way for data, Cell Reselections. CRRM entity is not supposed to be consulted for channel switching or for soft handover, since the RRM in RNC/BSC shall handle these kind of cases. The considered handovers are of the following type: between two RNCs; between two BSCs; between an RNC and a BSC, and vice versa. The basic idea behind the "Policy-based CRRM approach" is the standardisation of parameters and information exchange over an open interface between RRM and CRRM entities. This would enable the CRRM entity to provide CRRM policies to the RRM entities, thus allowing the traffic situation in the network to be dynamically adjusted on the basis of a common strategy. In this proposal the CRRM entity only acts as an advisor, so that the RRM entities still take the final decisions (RRM is the master), but based on parameters adjusted by a centralised CRRM. According to this policy, while the RRM entities take the fast decisions required for each Access Request or Handover Request, the CRRM entity works at a slower time scale and provides policies to the RRM entities whenever an update is necessary. In this sense the frequency for a policy update depends on the traffic variations within the involved cells. The updating frequency can also be subject to configuration. The CRRM entity would be able to work on a faster time scale than O&M, in order to dynamically react to traffic load variations in overlapping radio resource pools. The "CRRM policy based approach" describes the functional relationship between CRRM and RRM by three functions:
1. CRRM triggers RRM to report measurement/load information or RRM reports initiated by the RRM entity itself.
2. CRRM can inform RRM about CRRM related information (e.g.: cell capacity and load situation of neighbour cells which are not under control of this RRM function.
3. CRRM sets load targets for the RRM functions for which the CRRM entity is responsible.

This can be obtained by the following four procedures:
Measurement Initiating Procedure (CRRM initiated): CRRM triggers RRM to report a load measurement for a cell which is controlled by this RRM function. The report characteristics may be e.g. periodic, on demand, or event driven (e.g. by a load level). The possibility to report load measurements for more than 1 cell at one time should be allowed.
Measurement Reporting Procedure (RRM initiated): Here the RRM may report load measurements per measurement object to the CRRM which is responsible for this RRM.
Neighbour Cell CRRM Information Procedure (CRRM initiated): Based on the measurements received from different RRMs the CRRM derives the "Neighbour Cell CRRM Information" (distinguished per cell and per service) and sends it to all possibly affected RRM instances (neighbour cells in this sense are only those neighbour cells controlled by neighbour RRMs, since for cells of its own RRM no support is needed). This information is then used by the RRM in case of a handover (if cells of neighbour RRMs are involved) to prioritise the target cell.
Load Target Setting Procedure (CRRM initiated): When a load target—which can dynamically be set by CRRM per cell—is exceeded, the serving RRM of the according cell takes autonomous RRM decisions based on the provided policy (Neighbour Cell CRRM Information, e.g. ranking of target cells). This concerns the following RRM decisions:
Handover due to load reasons.
Redirect due to load reasons.

The procedure advises RRM to aim at a certain load level within a cell, however the resulting actions must not increase blocking and dropping rates for calls in the corresponding cell.

Cell capacity and load situation parameters managed by said procedures constitute as many Information Elements (IE) included in respective fields of relevant messages foreseen in the specifications.

APPROACH TO THE TECHNICAL PROBLEM

The standardised Cell Capacity and cell load Information Elements listed above, that are exchanged between radio network controllers even of different RATs, are largely insufficient to make a CRRM plenty effective. Relevant causes of said insufficiency so as partial remedies to the consequent drawbacks have been disclosed in two patent applications of the same Applicant (SIEMENS) designing the same inventor, namely:
1. EP 02425674.5, filed on 6-11-2002, titled: "TRAFFIC LOAD MANAGEMENT METHOD BASED ON THE EXCHANGE OF SERVICE SPECIFIC FREE CAPACITY INFORMATION ELEMENTS AMONG RADIO ACCESS NETWORK CONTROLLERS".
2. EP 02425675.2, filed on 6-11-2002, titled: "QoS BASED TRAFFIC LOAD MANAGEMENT METHOD IN A MULTI-RAT NETWORK".

The invention disclosed in the first patent application (EP 02425674.5) concerns the opportunity to consider, in addition to the aforementioned standardised Information Elements for Cell Capacity/Load RT/NRT, new service specific Free Capacity Information Elements. These IEs are defined to indicate the available free capacity for a given service by taking into account the capacity that is configured for that service and the actual occupation of this capacity. Service specific Free Capacity IEs take into account free capacity on both dedicated and shared resources, they are exchanged among different radio network controllers to allow the issue of optimal decisions concerning intra-RAT or inter-RAT handovers, or cell reselections for packet data.

Always in the first patent application a centralised dynamical resource reservation method is further disclosed. According to the method, new service specific capacity settings parameters are set by a centralised CRRM entity for every RRM entity. The purpose of these settings is to ask the RRM to reserve a certain amount of resources for certain services. Moreover, the new service specific capacity settings parameters allow for a dynamical resource reservation to specific services with clear benefits on central traffic steering capabilities in a multi-RAT network accessed by a varying population of multi-mode terminals.

The invention disclosed in the second patent application (EP 02425675.2) concerns the impact of traffic load on the QoS. Traffic load in the cells may seriously affect QoS either directly or indirectly. A traffic congestion situation directly affect the overall QoS if the incoming calls are to be refused, so as handovers towards the congested cell. The congestion indirectly affect the experienced QoS when the network is forced to downgrade the actual quality in order to add up new traffic. For example, in the old GSM a cell load dependent activation of Half Rate (HR) channels TCH/H instead of Full Rate TCH/F can be implemented within a cell where dual rate channels are configured. In a more sophisticated way an Adaptive Multi Rate (AMR) code is provided both for GSM and UMTS. According to the method of the secondly cited patent application (EP 02425675.2), in addition to the standardised Information Elements exchanged for the aim of cell load traffic management among RRM entities (via one or more CRRM entities), new Information Elements corresponding to service specific cell QoS Indicators are added up. That enables to distinguish the general service specific QoS situation in the cell, in order to take reliable decisions concerning handovers or cell reselections among different radio access network controllers. The optimal decision is a consequence of an improved strategy for balancing between RT and NRT traffic inside singular cells of a same RAT.

OUTLINED TECHNICAL PROBLEM

As previously said, by exchanging cell information, one RNC can for example know about the service specific free/reserved capacity and/or the QoS situation of a neighbouring GSM cell, or vice versa.

However, even if the above proposals try to save as much as possible of the 3GPP UMTS/GSM Release 5 (Rel5) solution by enhancing it in two of the most critical issues, a number of problems remains:

In relation to the "Cell Capacity Class IE" one of the above proposals was solving the issue of "reserved capacities" for specific services. However, another problem is that "Cell Capacity Class IE" is meant to indicate a "static capacity", but capacity is nowadays a "soft capacity", i.e. a dynamic capacity, therefore it is difficult to give reasonable meaning to such an IE and it is difficult if not impossible to define it for a cell in a way that can be useful for CRRM purposes. Factors that play a major role in determining the "soft capacity" effect are: user mobility, cell breathing, QoS, signalling traffic, higher modulations and specific technologies like HSDPA (High Speed Downlink Packet Access), EGPRS (Enhanced GPRS), ECSD (Enhanced Circuit Switched Data), E-DCH (Enhanced Dedicated Channel), MIMO (Multiple Input-Multiple Output). All of these factors lead to the impossibility to determine a static capacity in terms of e.g. kbit/s with a sufficient precision: the same cell might support in some cases a maximum of 1220 kbit/s, while in other cases it could support a maximum of 4880 kbit/s, while in other cases where e.g. HSDPA is used this capacity might go up to around 10000 kbit/s. In the end, even assuming that we would fix an average value for the IE for a given cell, the indeterminacy that it would carry would be so high that its applicability would be extremely limited, and it would be impossible to derive from that value any information of user-available capacity in kbit/s for a specific service without considering other cell specific important information that are not part of the Rel5 solution.

In relation to the Load Values, one of the above proposals was solving the issue of "provided vs. guaranteed bitrate". However, more issues are identified in the following. The idea of comparing Load Values is the common basis of CRRM solutions since GSM early phases where the coordination of different BSCs was tackled in standardisation: a "Load Indication Procedure" was defined for this purpose in GSM 8.08 (now renamed as TS 48.008). We are however not aware of any implementation of such ideas in GSM systems. Load values are known to be a basic input to cell specific CAC (Call Admission Control) algorithms that vary among systems and consider cell/system specific thresholds and settings. Therefore it is practically impossible to directly compare load values from different systems without using their specific CAC algorithms. On the other hand, it would be absurd to implement in every RNC/BSC CAC algorithms for every possible technology and every possible cell configuration. Moreover, Rel5 Load Value and RT Load Value are defined as percentages and refer to percentages of the Cell Capacity Class. This gives an indication of a possibility to "calculate" load in terms of occupied capacity, and the possibility to "calculate" a free capacity by substraction from a total capacity that would be indicated by Cell Capacity Class, but this is not possible due to the big indetermination that the Rel5 solution carries. Summarizing, it is conceptually impossible to directly compare load values from different systems, and referencing the load values to an ambiguous indication of static capacity would make it worse.

The Rel5"NRT Load Information" gives again a very undefined and ambiguous information. In general, it does not help to know if the cell can accept a certain NRT service characterised by a Maximum Bitrate, a specific technology, a certain priority or a certain need for the cell change to be made.

All the Rel5 solutions do not say anything about extremely important technologies like HSDPA, EGPRS, HSCSD or ECSD. The Rel5 solution cannot therefore consider at all these kind of resources during inter-RNC/BSC cell changes.

It is therefore evident how the current Rel5 approach to the problem brings to a number of issues that compromise the whole solution. The current Rel5 approach is vague, lacks important information, and the generality of the definition of its IEs make it possible for different kinds of interpretations that all contribute to enlarge the indeterminacy on each IE. Even if it would be easily possible to set some values to those IEs, the indeterminacy that they would suffer would make it impossible to use them consistently in the receiving node, therefore making the whole solution useless. It is highly expected that the current Rel5 solution as it was standardised will never be implemented due to deficiency of achievable gains. Summarizing, the major problem of the prior art, in particular the current Rel5 solution, is identified in the following: it tries to provide a limited and insufficient number of parameters, that are specific to a certain system, to a different system that is in fact not capable to interpret the received information. I.e.: cell capacities and loads are somehow CAC parameters that are system specific, and so are the CAC algorithms in every RNC/BSC with their different thresholds, settings and system specific strategies: the current Rel5 solution is based on the wong approach where CAC parameters specific to e.g. UMTS are provided to CAC algorithms specific to e.g.

GSM, therefore creating a fundamental incompatibility or indeterminacy. In the UMTS SRNC case the situation is even worse: GSM specific CAC parameters are provided to the SRNC that does not normally implement any CAC algorithm. Summarizing, the Rel5 solution is based on a totally wrong approach as it brings information to a place that lacks the capability to interpret this information.

OBJECTS OF THE INVENTION

The main object of the present invention is that to overcome the drawbacks of the prior art (disclosed both in the current standardisation and the two cited patent applications) concerning Information Elements to be exchanged among various entities deputed to CRRM/RRM upon a geographical area where cells of several Radio Access Technologies overlap and to indicate a Common Radio Resource Management (CRRM) method in a multi-RAT cellular telephone network.

SUMMARY AND ADVANTAGES OF THE INVENTION

To achieve said objects the subject of the present invention is a common radio resource management method, as disclosed in the claims.

Having above identified the major problem of current Rel5 solution, the disclosed method depicts a completely new approach to the problem that eludes all the presented Rel5 drawbacks by eliminating the major problem at the basis.

The disclosed method foresees that the source system directly provides the target system with a description of the available bearer services in the concerned cells of the source system. This description is obtained in the source system as an output of system specific CAC-like algorithms that make use of system specific parameters like cell capacity, loads and others.

CAC-like algorithms are tasked to make CAC-estimations, i.e. predictions on the bearer service availabilities of a particular cell. This information should be considered in the receiving node prior to a cell change towards that particular cell.

The description of the Cell Availabilities includes description of the Bearer Service Availability for a number of fundamental types of bearer services.

Bearer services are distinguished by traffic class: Conversational, Streaming, Interactive and Background. This distinction is due to the different QoS characteristics of these bearer services in terms of Eb/No, error rates, priorities, delay and others, for which these classes have different typical requirements, leading to a significant difference among these bearer service types.

Bearer services can also be distinguished by specific radio access technology, i.e. HSCSD, ECSD, EGPRS, HSDPA, E-DCH, MIMO, leading to the description of e.g. the Interactive HSDPA Bearer Service Availability.

The Bearer Service Availability for a specific bearer type can be described separately for uplink and downlink, or for both uplink and downlink in one instance.

The Bearer Service Availability for a specific bearer type can be described in terms of:
  availability of the bearer service for any cell change or just for the strictly necessary ones. The latter option would exclude availability for cell changes due to load reason or traffic reason, or directed retry.

maximum user bitrate in kbit/s that can currently be provided to the single user for the specified type of cell change, or indication that the bearer service is currently unavailable. This would refer to the Guaranteed bitrate for Conversational and Streaming bearer services, or to the Maximum bitrate for Interactive and Background bearer services.

indication of whether the specified bearer service can be provided to a high number of users, or only to a limited number of users.

In order to allow this functionality to be totally exploited, the network can make use of knowledge on:
  UE/MS capabilities to support specific technologies: HSCSD, ECSD, GPRS, EGPRS, FDD, TDDhcr, TDDlcr, HSDPA, E-DCH, MIMO.
  Cell capabilities to support specific technologies: HSCSD, ECSD, GPRS, EGPRS, FDD, TDDhcr, TDDlcr, HSDPA, E-DCH, MIMO.

Advantages of the Invention are Listed:
1. The RNC does not need to know about GSM peculiarities in order to evaluate a load value, but can just check the availability of a specific service considering also the UE capabilities. The same applies for all the combinations of source and target RAT and specific cell configurations.
2. Evaluation of load values and available capacities are done in the correct node: the Controlling node where CAC is placed. The Rel5 solution instead places the evaluation of load values in the Serving node where the appropriate CAC evaluation algorithm is often missing.
3. The proposed solution considers the most important technologies (HSDPA, EGPRS, . . . ) for each system (GSM, UMTS, . . . ).
4. The proposed solution is feasible and it avoids the complexity of calculation and settings of the Rel5 IEs, and it avoids the resulting interoperability problems among different systems and vendors.
5. Unambiguity of the IEs at the receiving node: the receiving node can immediately evaluate whether a service can be placed into that cell or not, and it can also make a comparisons among different cells.
6. The solution considers all the open issues indicated for the Rel5 solution (e.g. reserved capacities, provided vs. guaranteed bitrate, priorities, signaling load, . . . ) as they are implicitly considered in the determination of "Cell Availabilities IE" in the right place, i.e. in the Controlling node, that, being responsible of controlling the concerned cells, is the most suitable place for this estimation.

BRIEF DESCRIPTION OF THE DRAWINGS

The features of the present invention which are considered to be novel are set forth with particularity in the appended claims. The invention, together with further objects and advantages thereof, may be understood with reference to the following detailed description of an embodiment thereof taken in conjunction with the accompanying drawings given for purely non-limiting explanatory purposes and wherein:

FIGS. 3, 4, 5, and 6 (already described) show some topologies for traffic management;

DETAILED DESCRIPTION OF AN EMODIMENT OF THE INVENTION

Figure 1:
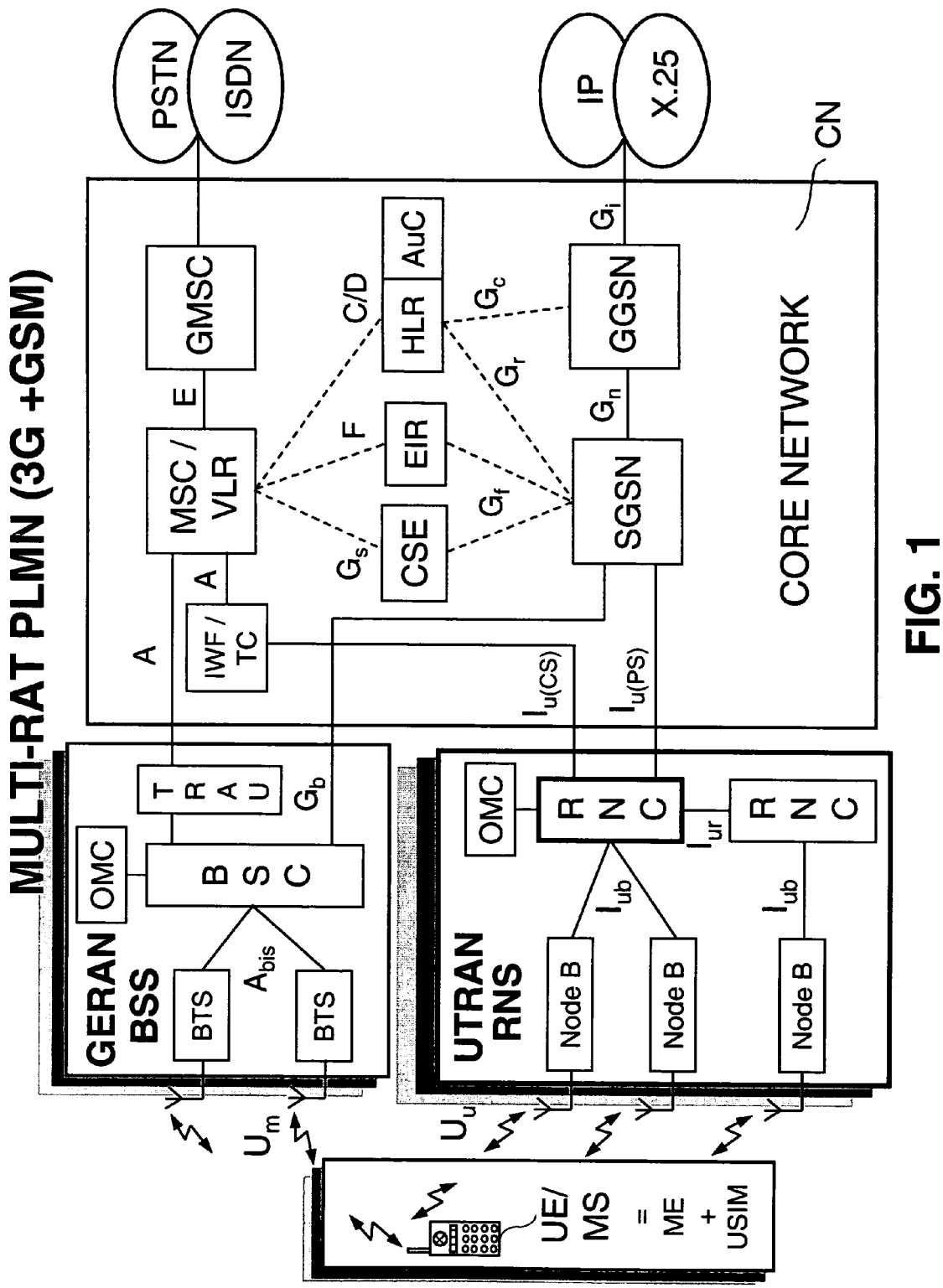
FIG. 1 (already described) shows a known diagram of a Multi-RAT (GSM+3G) PLMN.
Figure 2:
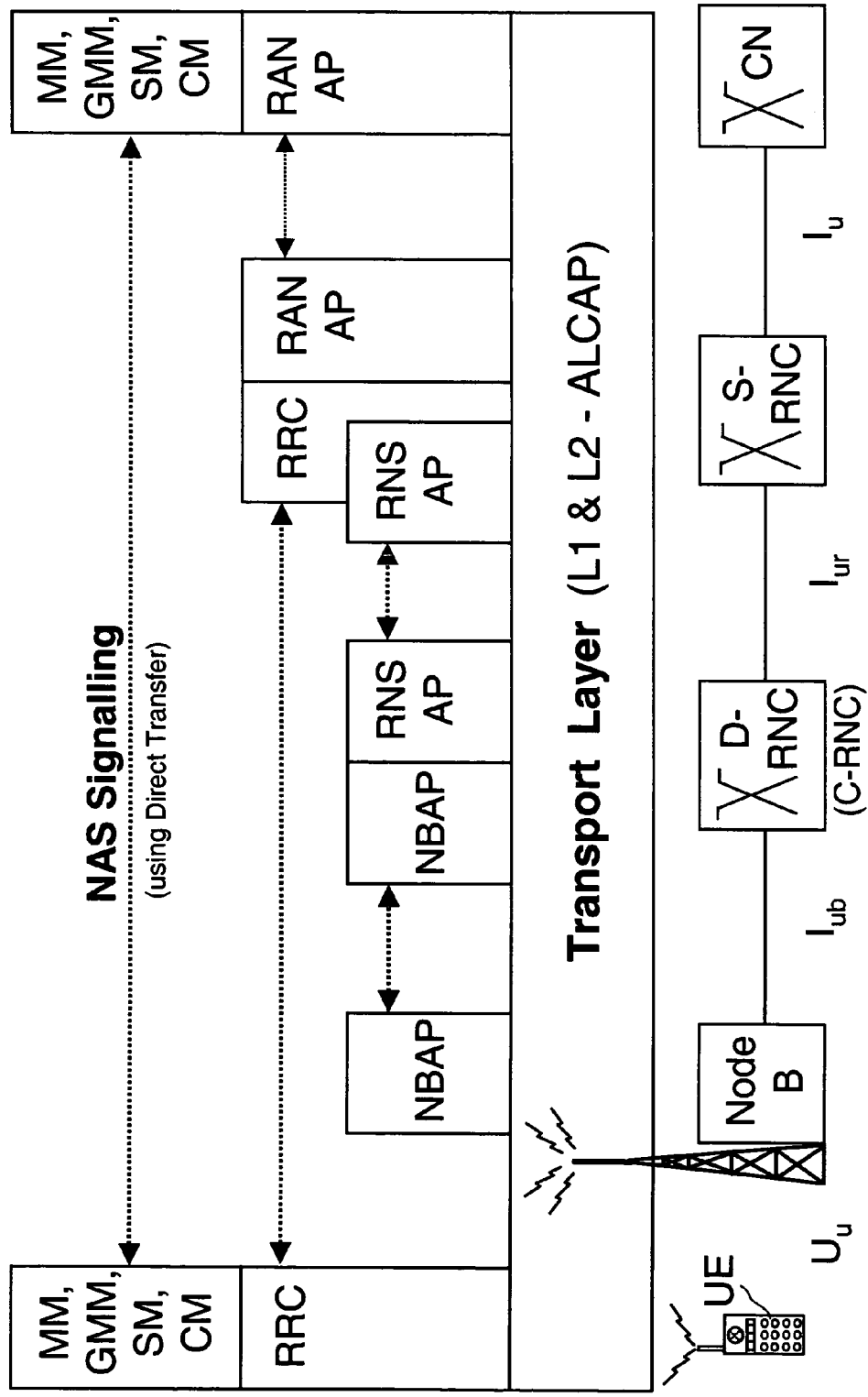
FIG. 2 (already described) shows the UMTS signalling Control Plane.

The following definitions of Bearer Services apply:

Conversational Bearer Service: it refers to RABs whose traffic class is defined as Conversational, or GERAN Speech bearer services, or GERAN CS Data bearer services, or GPRS/EGPRS PS Data bearer services with comparable characteristics (priority, guaranteed bandwidth, delay) to RABs whose traffic class is defined as Conversational.

Streaming Bearer Service: it refers to RABs whose traffic class is defined as Streaming, or GPRS/EGPRS PS Data bearer services with comparable characteristics (priority, guaranteed bandwidth, delay) to RABs whose traffic class is defined as Streaming.

Interactive Bearer Service: it refers to RABs whose traffic class is defined as Interactive, or GPRS/EGPRS PS Data bearer services with comparable characteristics (priority, guaranteed bandwidth, delay) to RABs whose traffic class is defined as Interactive.

Background Bearer Service: it refers to RABs whose traffic class is defined as Background, or GPRS/EGPRS PS Data bearer services with comparable characteristics (priority, guaranteed bandwidth, delay) to RABs whose traffic class is defined as Background.

The IEs, or CRRM information, are the main characteristic of this invention: they are referred to as "UTRAN Cell Availabilities" and "GERAN Cell Availabilities". Cell Availabilities IEs of a specific UTRAN cell for Downlink and Uplink in accordance with the present invention are described in APPENDIX 1. Cell Availabilities IEs of a specific GERAN cell for Downlink and Uplink in accordance with the present invention are described in APPENDIX 2. With reference to these appendixes, the Bearer Service Availability IE describes the availability of a Bearer Service in the cell.

With reference to APPENDIX 3 and APPENDIX 4 the Bearer Service Availability IE is composed by a Link Reference, a Cell Change Reason, a Maximum Bearer Service Bitrate and a Bearer Service Number Indication. The Link Reference specifies whether indication is given for uplink, downlink, or uplink and downlink. The Cell Change Reason indicates whether the resource is available for any kind of cell change or not. The Maximum Bearer Service Bitrate indicates either the current unavailability of the service or its availability, in which case it gives also indication of the maximum bitrate that can currently be allowed. Note that in case of Conversational or Streaming bearer services, the Bitrate Value corresponding to Maximum Bearer Service Bitrate approximately indicates the maximum value for the "Guaranteed bit rate" (RAB Attributes) that can currently be provided to a single user, while in case of Interactive or Background bearer services it approximately indicates the maximum value for the "Maximum bitrate" (RAB Attributes) that can currently be provided to a single user. The Bearer Service Number Indication can be used to say that a few or many of the bearer services of the specified throughput can be provided in the cell.

If the RNC/BSC knows or is made aware of the cell capabilities, it can decide to retrieve the Cell Availabilities in order to assess a possible cell change for a UE.

Cell Capabilities that should be known are:
GSM Cell Capabilities: HSCSD, ECSD, GPRS, EGPRS.
UMTS Cell Capabilities: FDD, TDDhcr, TDDlcr, HSDPA.

Furthermore, by matching UE Capabilities with Cell Capabilities and Availabilities, the best possible service can be provided to the user.

Referring to "UE" as a generic term for a multi-RAT capable terminal station, UE Capabilities that should be known are:
GSM UE capabilities: HSCSD, ECSD, GPRS, EGPRS.
UMTS UE capabilities: FDD, TDDhcr, TDDlcr, HSDPA.

The way how said CRRM information is transferred among the involved network nodes is disclosed in the procedural part described with the help of the remaining FIGS. 7 to 14 and of FIG. 15 which is described in advance in the following.

Figure 15:
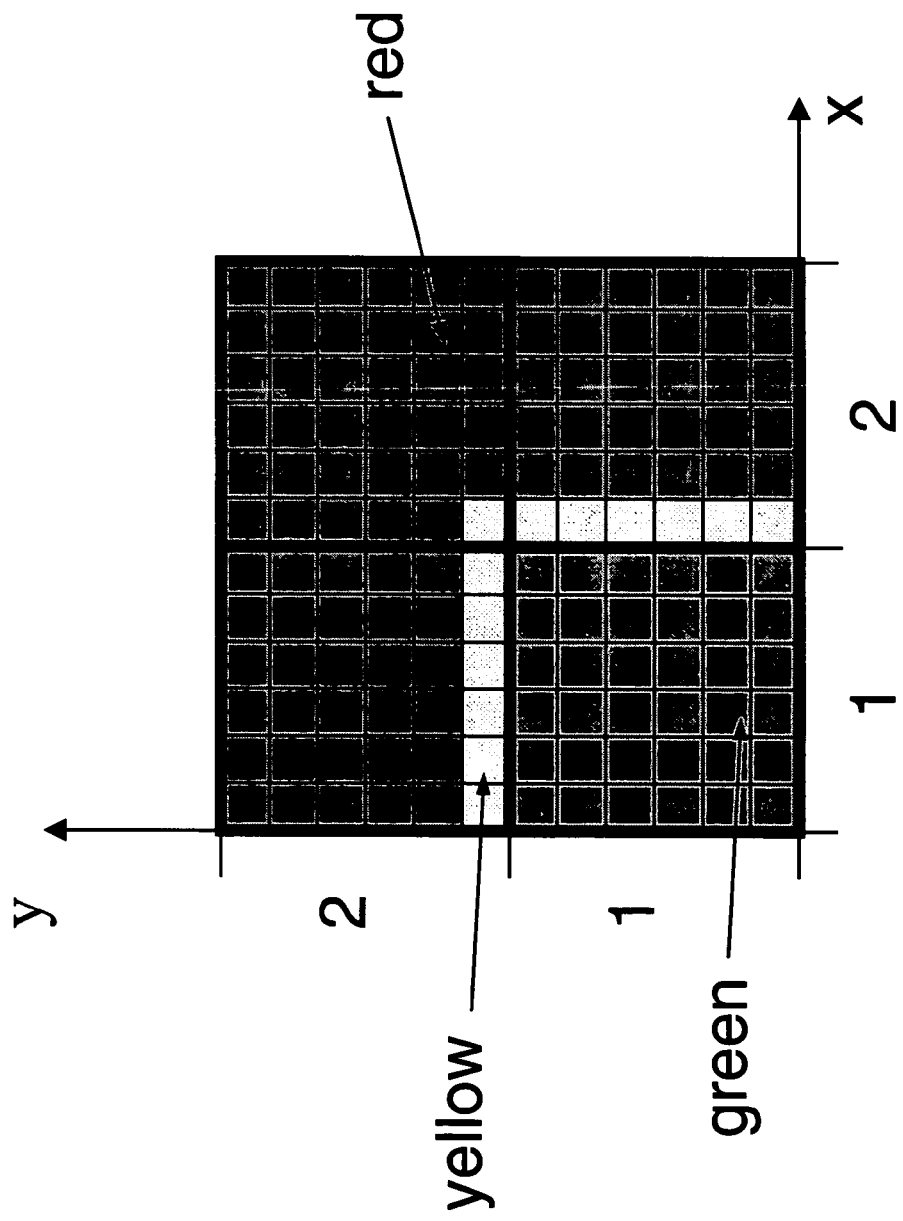
FIG. 15 shows overlapping areas for the controlled and neighbour cells that can be involved in cell change decisions in different circumstances.

With reference to FIG. 15, the following reasoning on "Controlled Cells and Neighbourhood" is made. An overlapping area is defined as an area where different cells overlap: in this sense we have overlapping radio accesses. If said cells belong to different RNC/BSC, then a user that can access both systems would experience a better service if the overlapping radio accesses would be coordinated.

In this sense, every RNC/BSC needs to know at least the identifiers and some information of the other RNC/BSC cells that are neighbor to the cells that they directly control. This is because those cells might be involved in cell changes for UEs/MSs controlled by those RNC/BSCs. In UTRAN there are different SRNC and DRNC roles: this implies that the SRNC can take decisions involving cells that are not overlapping with the cells that it directly controls, i.e.: the SRNC needs to know at least the identifiers and some information of the cell where the UE is currently being served, and its neighbors, depending on specific mobility cases for specific UEs. From the above, we conclude that in UTRAN the SRNC has not only to deal with overlapping or neighbouring cells of other RNC/BSC that could be possible target cells for a cell change where the source cell is directly controlled by the SRNC. The SRNC will also quite often have to deal with cells controlled by other RNC/BSCs in which it happens to be SRNC for a UE, or with its neighbours. In principle, the SRNC might have to deal with cells that could be everywhere in the PLMN. For simplicity, it is assumed in FIG. 15 a squared geometry where RNCs and BSCs directly control cells in a squared area that we call "RNC/BSC area". Each RNC/BSC area is in the example formed by 36 squared cells of the same dimensions. In the example, 4 RNC/BSC areas are shown. We will refer to those areas as A(X,y), and to "A(x,y) cells" as the cells in that area. We assume that 2 overlapping layers exist: one GSM and one UMTS. We assume that their cell topology is the same and is characterised by exact geographical overlap. Therefore we have 4 areas for every technology, referred as $A_{GSM}(x,y)$ and $A_{UMTS}(x,y)$. $A_{GSM}(x,y)$ cells are controlled by RNC(x,y), while $A_{UMTS}(x,y)$ cells are controlled by BSC(x,y). The GSM cells in one layer in the green area are controlled by BSC(1,1), while the UMTS cells in the other layer in the green area are controlled by RNC(1,1). Based on previous reasoning on "Controlled Cells and Neighbourhood", we can say:

1) For CRRM purposes, BSC(1,1) needs to know information of:
cells in the green area controlled by RNC(1,1) and by the same BSC(1,1).
cells in the yellow area controlled by the other RNCs and BSCs.
2) For CRRM purposes, RNC(1,1) needs to know information of:
cells in the green area controlled by BSC(1,1) and by the same RNC(1,1).
cells in the yellow area controlled by the other RNCs and BSCs.
cells in the red area controlled by the other RNCs and BSCS when it happens to be SRNC for a UE in those cells or in their neighbours.

As far as the Cell Capabilities are concerned, two different procedures are envisaged for the near future:
1. Cell Capability information of neighbour cells can be configured by O&M in the RNC/BSC. This is specially suited to GSM, where the BSC only needs to know information of cells that are overlapping or neighbouring cells to cells that it directly controls. For an RNC, it is also sensible that Cell Capabilities are configured for those cells that are overlapping or neighbouring cells to cells that it directly controls. With reference to FIG. 15, Cell Capabilities of other RNC/BSC cells in the green and yellow area need to be set by configuration in the RNC/BSC(1,1).
2. For UMTS DRNC case, it is sensible that another method is foreseen. Cell Capability information of both GSM and UMTS cells and neighbouring cells can be transferred from DRNC to SRNC on appropriate procedures over Iur, depending on specific mobility cases for specific UEs that are served by the SRNC. With reference to FIG. 15, Cell Capabilities of other RNC/BSC cells or neighbour cells in the red area need to be communicated depending on specific UE mobility cases to RNC(1,1). The currently standardised procedure foresees the inclusion of cell capabilities into existing RL Setup, RL Addition and Uplink Signalling Transfer procedures as described below.

Cell Capabilities procedures in UMTS DRNC case:
1. UMTS Cell Capabilities are communicated:
  into "Neighbouring UMTS Cell Information" in the following messages:
    i. RADIO LINK SETUP RESPONSE, RADIO LINK SETUP FAILURE,
    ii. RADIO LINK ADDITION RESPONSE, RADIO LINK ADDITION FAILURE.
  into a specific "Cell Capability Container" in UPLINK SIGNALLING TRANSFER INDICATION message.
2. GERAN Cell Capabilities are communicated:
  into "Neighbouring GSM Cell Information" in the following messages:
    i. RADIO LINK SETUP RESPONSE, RADIO LINK SETUP FAILURE,
    ii. RADIO LINK ADDITION RESPONSE, RADIO LINK ADDITION FAILURE.

As far as the Cell Availabilities are concerned, the RNC/BSC will gather Cell Availabilities information from the appropriate RNC/BSC through appropriate procedures that need to be in the standard. Two different methods are envisaged for the near future:
between RNCs: "Information Exchange procedure" over Iur between an RNC and a BSC, or between BSCs:
  "handover/relocation procedures" over the CN interfaces Iu/A, and/or
  "RIM procedures" over the CN interfaces Iu/Gb.

In case A/Iu "handover/relocation procedures" are used:
When an handover/relocation is triggered, the source RNC/BSC can include the Cell Availabilities of the source cell, that will be passed to the target RNC/BSC.
When answering, the target RNC/BSC can inform the source RNC/BSC of the Cell Availabilities of the target cell.

In case Iur "Information Exchange procedure" or Iu/Gb "RIM procedures" are used: there is the possibility to require different "reporting characteristics" for the report messages, in particular the following two are of main interest:
"On demand" allows the Cell Availabilities to be reported immediately after the request.
"On modification" allows the requested RNC/BSC to trigger a report when the situation regarding Cell Availabilities in the concerned cells is changed, i.e. it allows the requesting RNC/BSC to be kept updated on Cell Availabilities of those cells. In the process of keeping the requesting RNC/BSC updated on Cell Availabilities of a certain cell, the requested RNC/BSC could include in Cell Availabilities IE only those optional fields for which the Bearer Service Availability has changed, meaning that the ones that have not been included have not changed since last update.

With reference to FIG. 15, we have the following cases:
The BSC and RNC by default should be kept updated on the Cell Availabilities of all the cells belonging to other RNC/BSC in the green and yellow area.
The RNC should be able "on demand" to gather Cell Availabilities of cells in the red area depending on specific needs. If needed, the RNC should also be able to ask to be kept updated on Cell Availabilities of those cells.

As far as the UE Capabilities are concerned, UE Capabilities need to be present on RRC protocols either in:
MS Classmarks (TS24.008): they contain most of the needed information in MS Classmarks 2 and 3. HSDPA is currently missing in this IEs and needs to be added so that the BSC can make proper use of Cell Availabilities.
UE radio access capabilities (TS25.306 for UMTS only) that specifies the access stratum part of UE radio access capabilities. A number of GSM technologies are currently missing in the relevant IES, and may need to be added so that the RNC can make proper use of Cell Availabilities.

FIG. 7 to 14 give reference network architectures helpful to understand the following procedural examples about Cell/UE capabilities.

Figure 7:
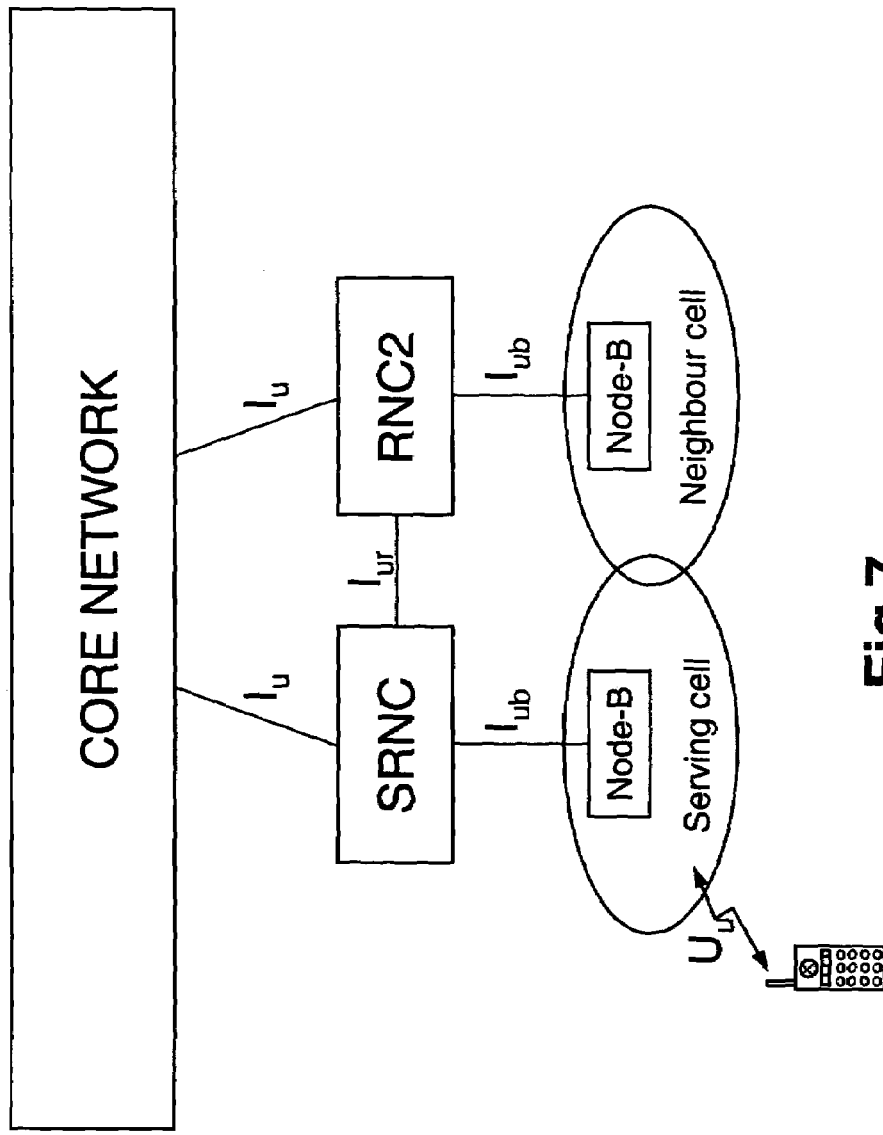
FIGS. 7 to 14 show some reference network topologies where CRRM procedures are applied that use the IEs of the present invention.

With reference to FIG. 7 an example with SRNC serving cell and neighbour cell of another RNC is described.

Assumptions:
RNC2 neighbouring cell is known by the SRNC.

Transfer of information:

Cell Capabilities of serving and neighbouring cell:
Serving cell: known.
Neighbouring cell: already known, as the SRNC is pre-configured with RNC2 neighbour Cell Capabilities by O&M at RNC2 cell configuration.

UE Capabilities:
Given to the SRNC via Uu RRC protocol.

Cell Availabilities of serving and neighbouring cell:
Serving cell: known.
Neighbouring cell: they can be transferred over Information Exchange procedure over Iur.

Figure 8:
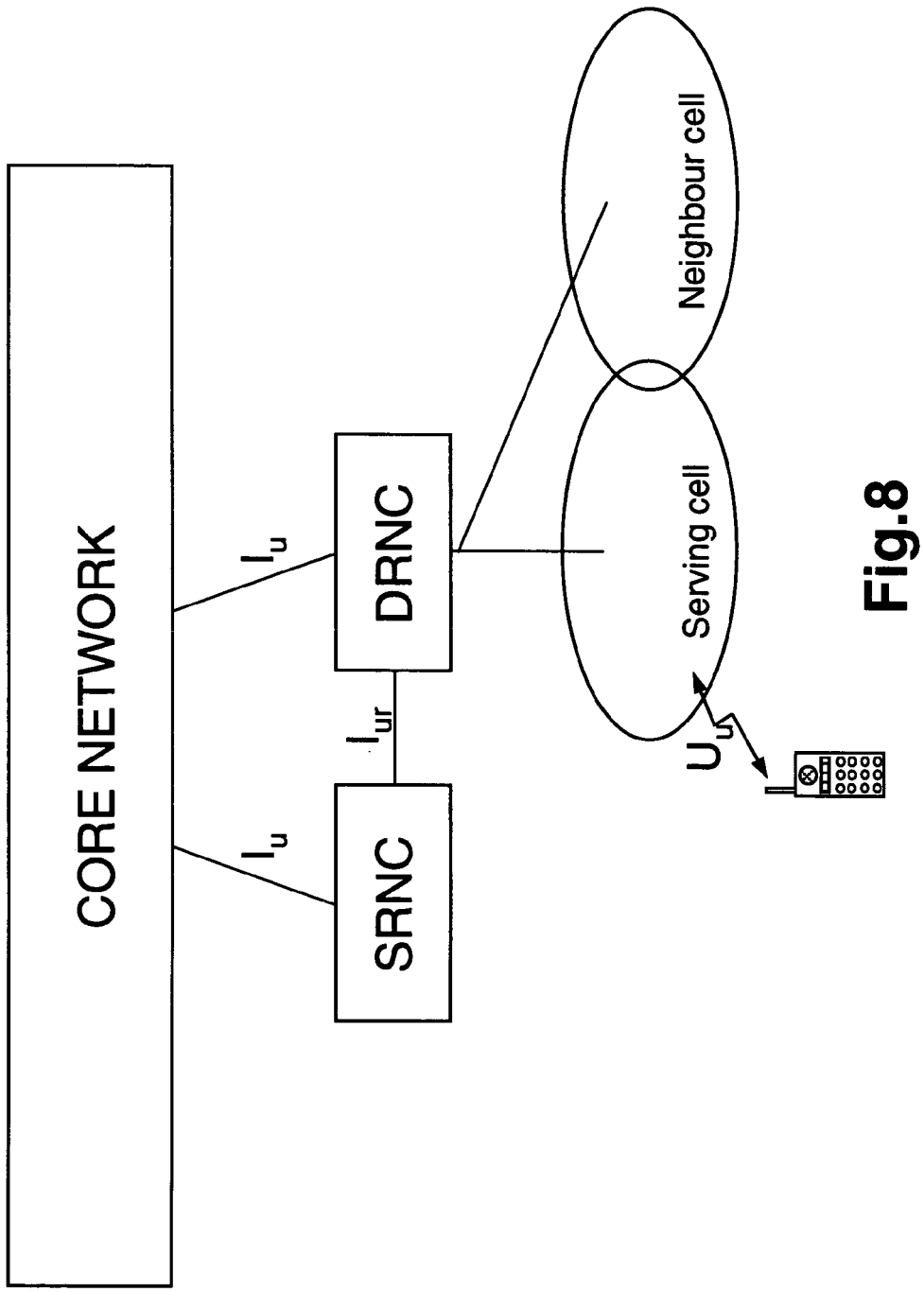

With reference to FIG. 8 an example with DRNC serving and neighbour cell is described.

Assumptions:
DRNC Serving cell is known by the SRNC, but the DRNC neighbouring cell is not known.
Serving and neighbouring cells could belong to the same or different Node-B.

Transfer of information:

Cell Capabilities of serving and neighbouring cell:
Serving cell: already known.
Neighbouring cell: transferred over Iur into existing RL Setup, RL Addition or Uplink Signalling Transfer procedures.

UE Capabilities:
Given to the SRNC via Uu RRC protocol.

Figure 9:
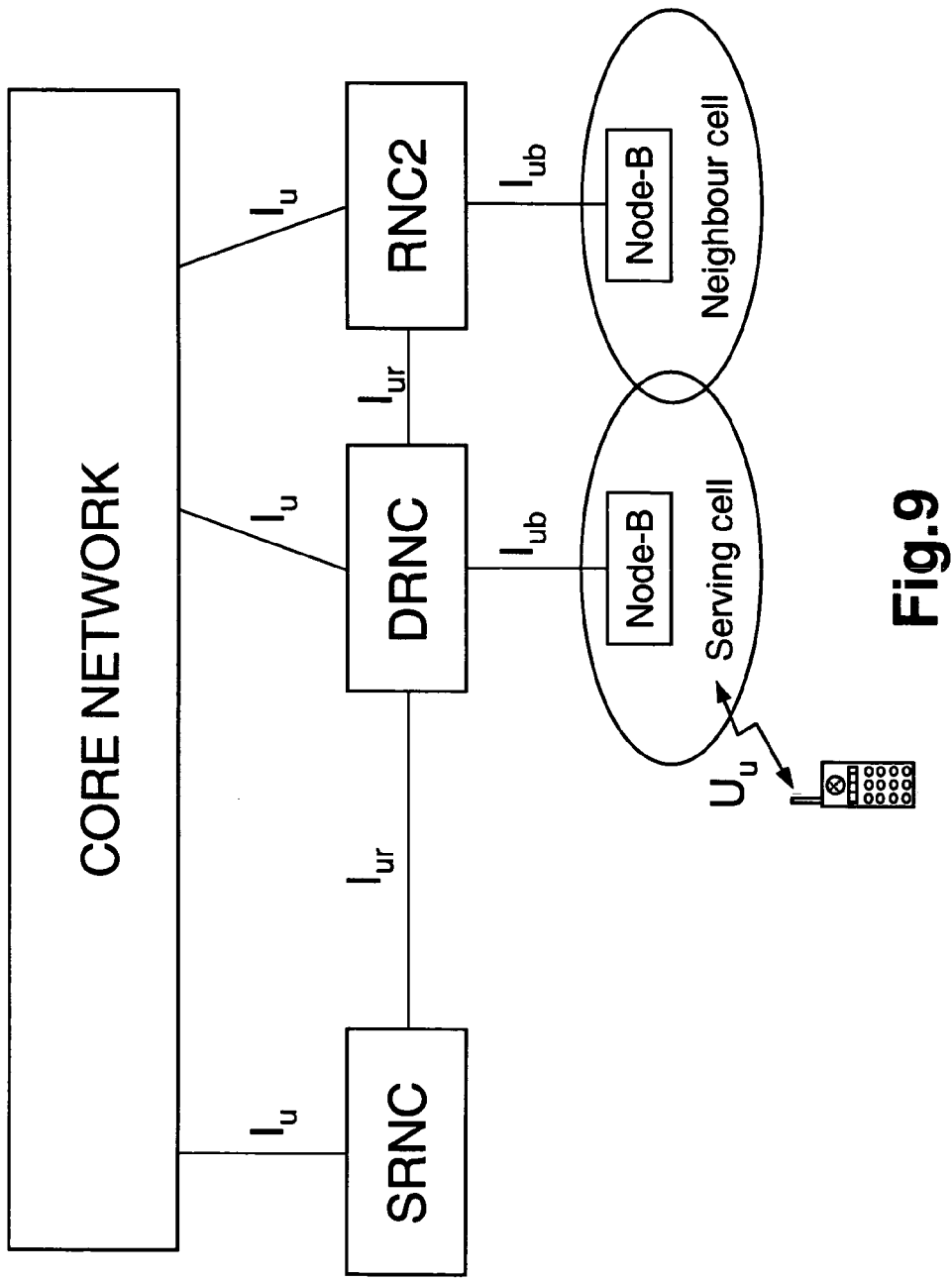
Figure 10:
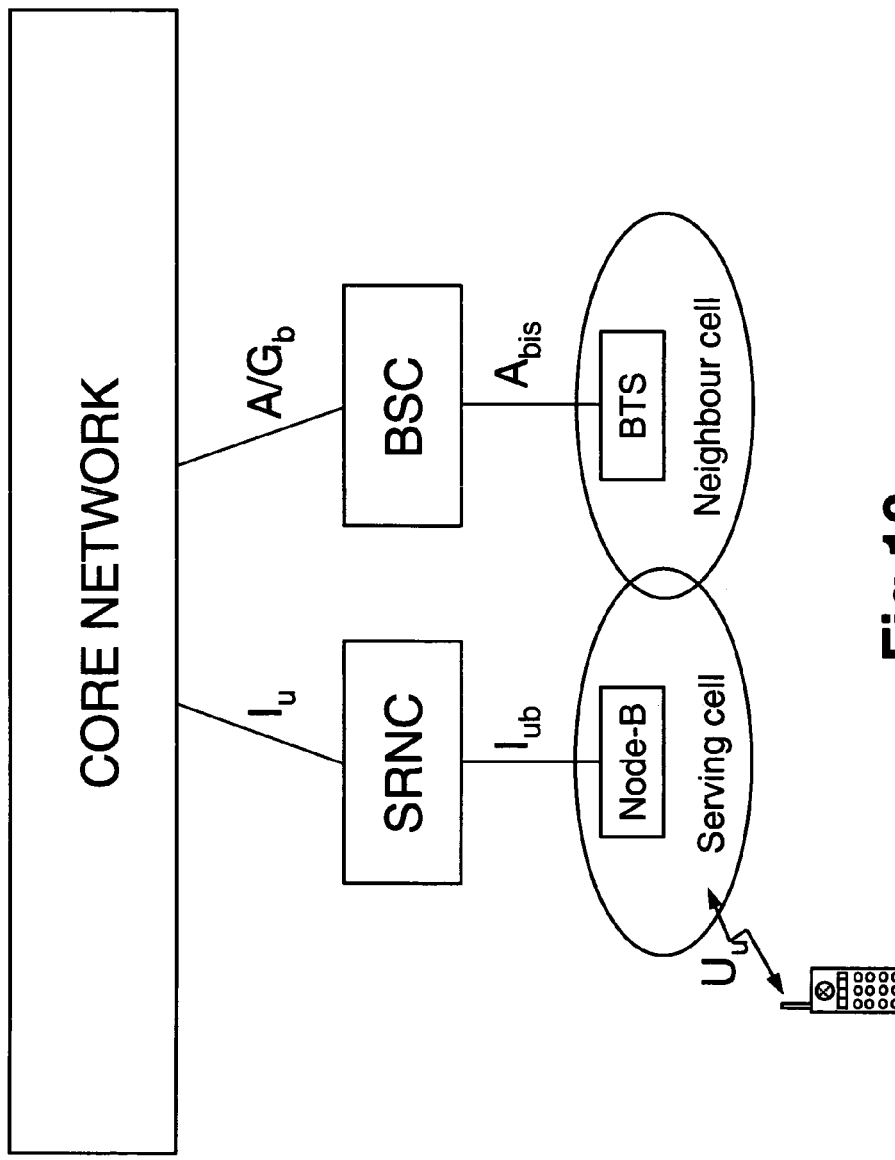

Cell Availabilities of serving and neighbouring cell:
They can be transferred over Information Exchange procedure over Iur.
With reference to FIG. 9 an example with DRNC serving cell and neighbour cell of another RNC is described.

Assumptions:
DRNC Serving cell is known by the SRNC because it is the Serving cell, but the RNC2 cell that is neighbouring to the DRNC Serving cell is only known to the DRNC.

Transfer of information:

Cell Capabilities of serving and neighbouring cell:
Serving cell: already known.
Neighbouring cell: signalled by the DRNC to the SRNC via Iur into existing RL Setup, RL Addition or Uplink Signalling Transfer procedures.

UE Capabilities:
Given to the SRNC via Uu RRC protocol. Cell Availabilities of serving and neighbouring cell:
They can be transferred over Information Exchange procedure over Iur between SRNC and RNC2
With reference to FIG. 10 an example with SRNC serving cell and neighbour cell of a BSC is described.

Assumptions:
BSC neighbouring cell is known by the SRNC.

Transfer of information:

Cell Capabilities of serving and neighbouring cell:
Serving cell: known.
Neighbouring cell: already known, as the SRNC is pre-configured with BSC neighbour Cell Capabilities by O&M at BSC cell configuration.

UE Capabilities:
Given to the SRNC via Uu RRC protocol.

Figure 11:
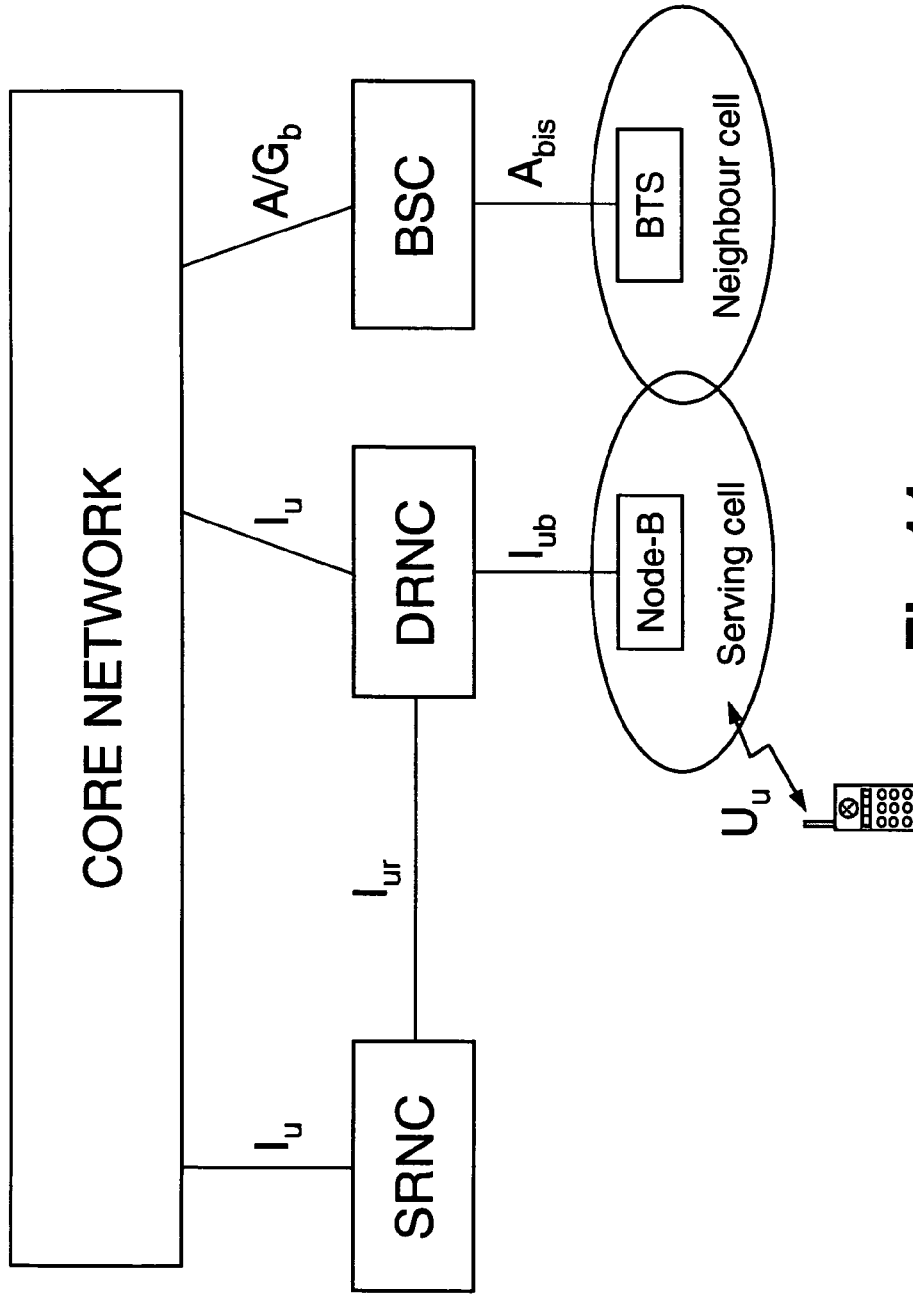

Cell Availabilities of serving and neighbouring cell:
Serving cell: known.
Neighbouring cell:
They can be attached to handover/relocation messages over A/Iu.
They can be transferred over RIM procedures over Gb/Iu.
With reference to FIG. 11 an example with DRNC serving cell and neighbour cell of a BSC is described.

Assumptions:
DRNC Serving cell is known by the SRNC because it is the Serving cell, but the BSC cell that is neighbouring to the DRNC Serving cell is only known to the DRNC.

Transfer of information:

Cell Capabilities of serving and neighbouring cell:
Serving cell: already known.
Neighbouring cell: signalled by the DRNC to the SRNC via Iur into existing RL Setup, RL Addition or Uplink Signalling Transfer procedures.

UE Capabilities:
Given to the SRNC via Uu RRC protocol.

Figure 12:
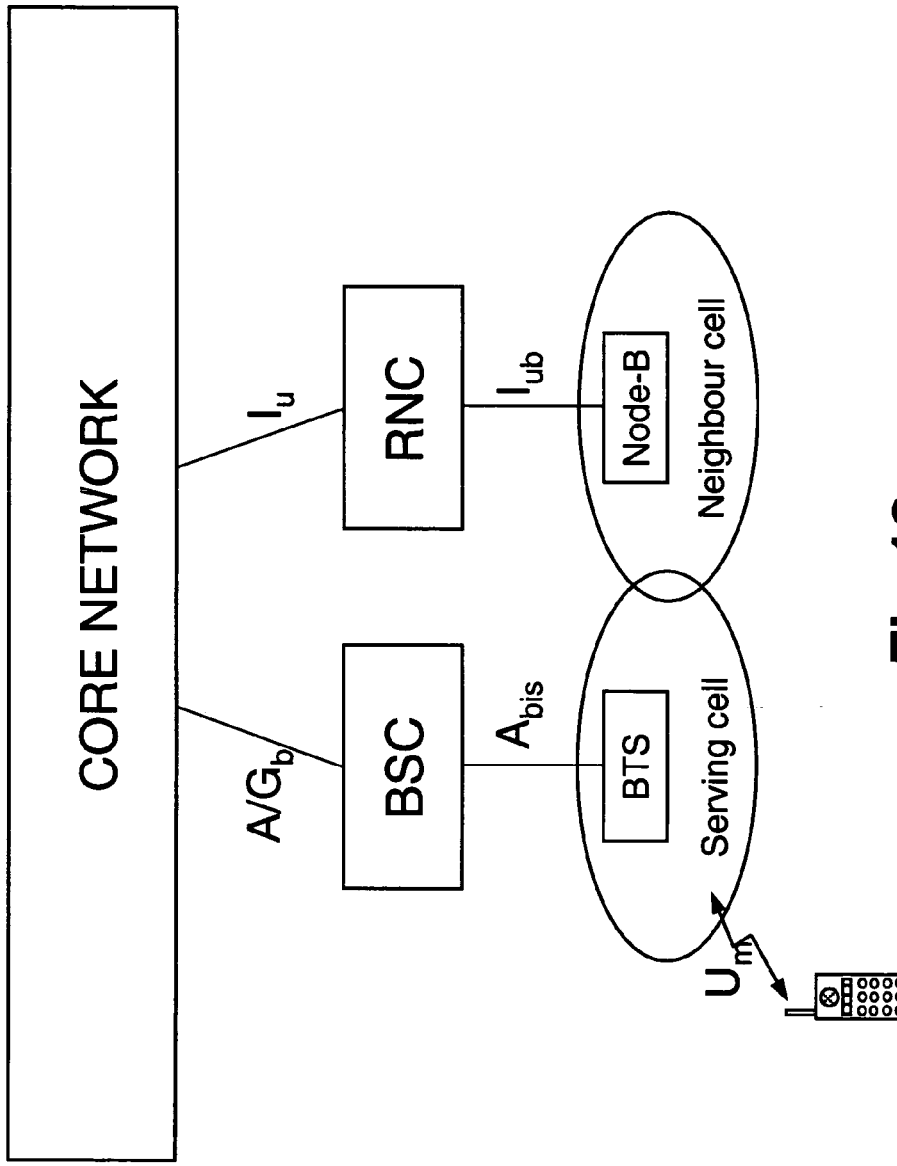

Cell Availabilities of serving and neighbouring cell:
Serving cell: they can be transferred over Information Exchange procedure over Iur.
Neighbouring cell:
They can be attached to handover/relocation messages over A/Iu.
They can be transferred over RIM procedures over Gb/Iu.
With reference to FIG. 12 an example Example with BSC serving cell and neighbour cell of an RNC is described.

Assumptions:
RNC neighbouring cell is known by the BSC.

Transfer of information:

Cell Capabilities of serving and neighbouring cell:
Serving cell: known.
Neighbouring cell: already known, as the BSC is pre-configured with RNC neighbour Cell Capabilities by O&M at RNC cell configuration.

UE Capabilities:
Given to the BSC via Um RRC protocol.

Figure 13:
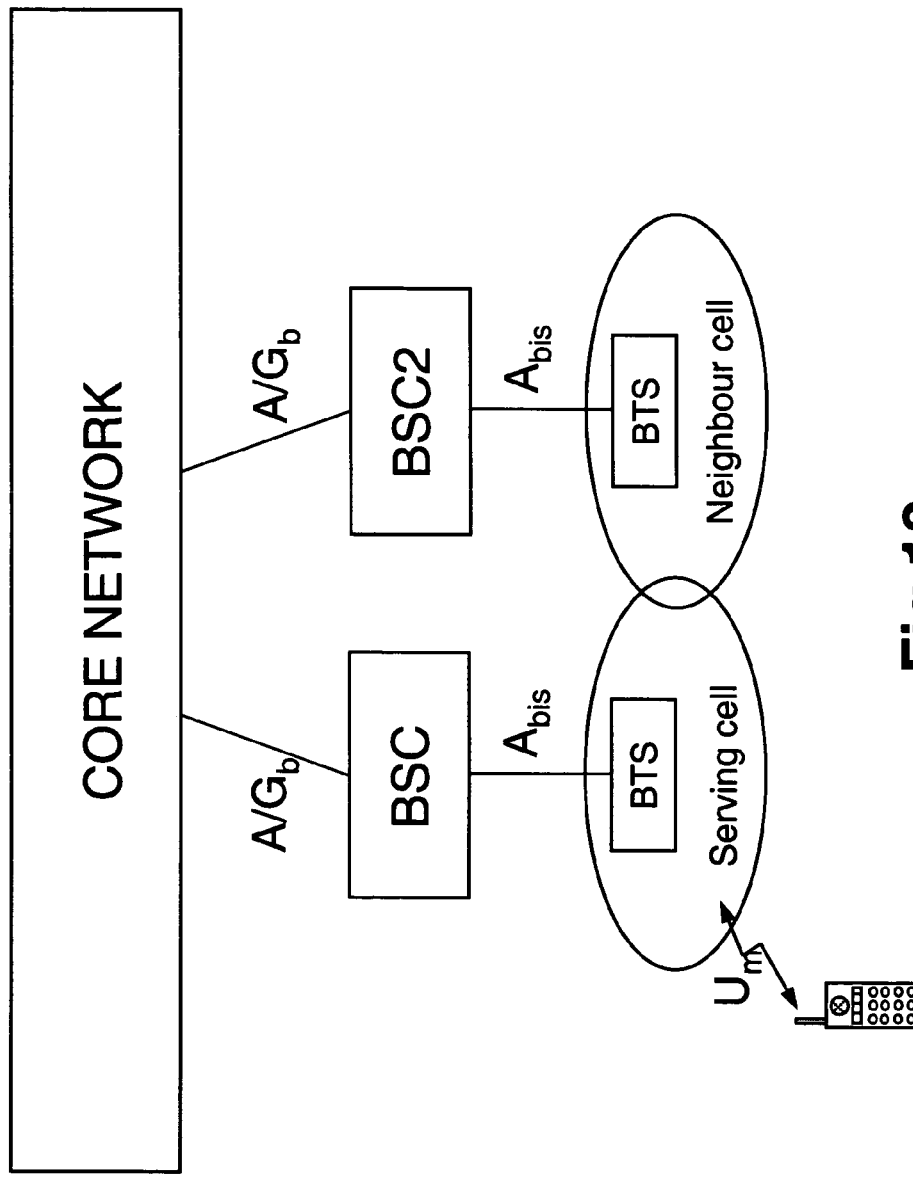

Cell Availabilities of serving and neighbouring cell:
Serving cell: known.
Neighbouring cell:
They can be attached to handover/relocation messages over A/Iu.
They can be transferred over RIM procedures over Gb/Iu.
With reference to FIG. 13 an example with BSC serving cell and neighbour cell of another BSC is described.

Assumptions:
BSC2 neighbouring cell is known by the BSC.

Transfer of information:

Cell Capabilities of serving and neighbouring cell:
Serving cell: known.
Neighbouring cell: already known, as the BSC is pre-configured with BSC2 neighbour Cell Capabilities by O&M at BSC2 cell configuration.

UE Capabilities:
Given to the BSC via Um RRC protocol.

Figure 14:
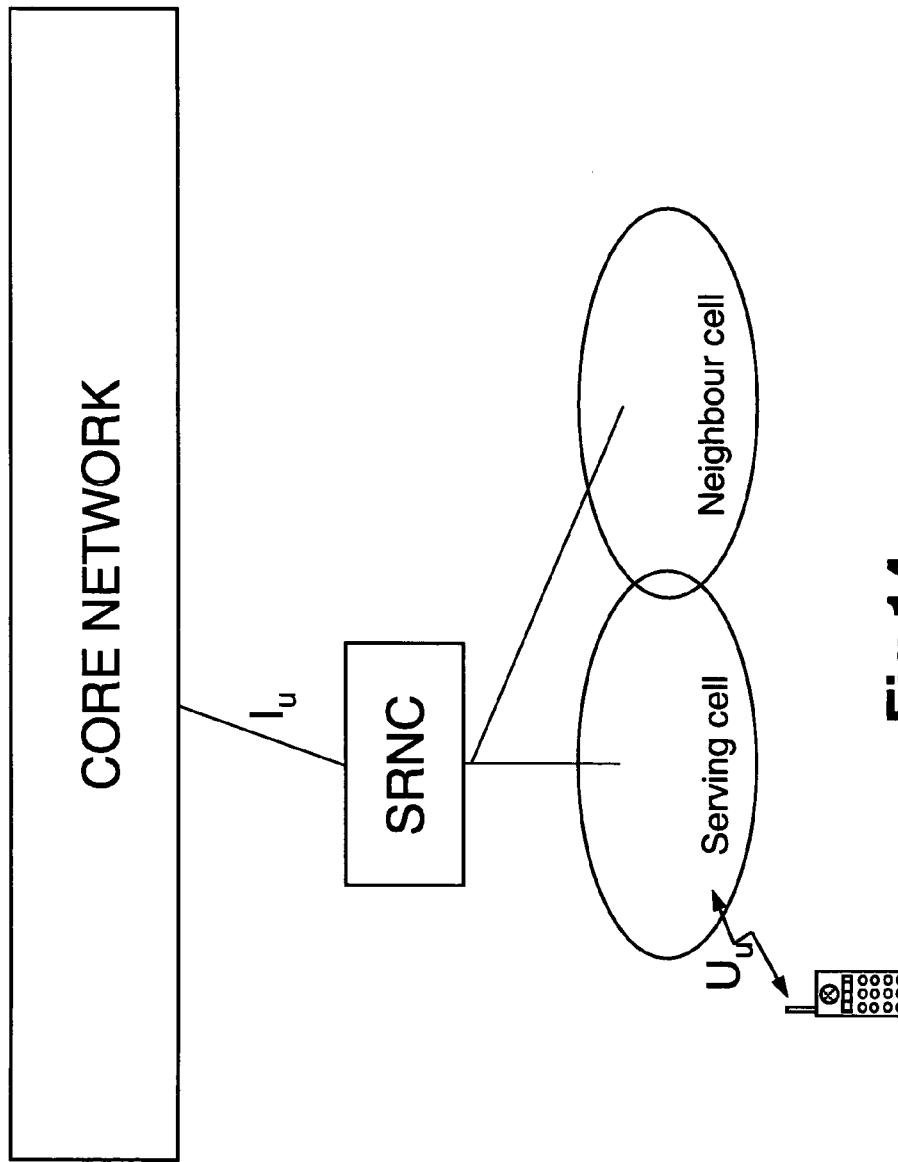

Cell Availabilities of serving and neighbouring cell:
Serving cell: known.
Neighbouring cell:
They can be attached to handover/relocation messages over A.
They can be transferred over RIM procedures over Gb.
With reference to FIG. 14 an example with SRNC serving and neighbour cell is described.

Assumptions:
although FIG. 14 is presented only for UMTS, the same is valid for GSM or any other technology.
The Neighbouring and Serving cell might belong to the same or different NodeBs or BTSs.

Transfer of information:

Cell Capabilities of serving and neighbouring cell:
Serving cell: known.
Neighbouring cell: known.

UE Capabilities:
Given to the SRNC via Uu RRC protocol.

Cell Availabilities of serving and neighbouring cell:
Serving cell: known.
Neighbouring cell: known.

Having illustrated so far the proposed IEs and the different procedural ways how they can be transferred, with reference to all the preceding Figures, Appendixes, and descriptions, some hints on the CRRM method of the invention is given.

In a simple situation of a necessary cell change, in case a Serving cell is no more suitable for a specific user, the SRNC/BSC that is responsible for user-UE specific RRM functions such as handover and cell-reselection needs to evaluate the suitability of a Neighbour cell as a target cell for the specific cell change. For this purpose the SRNC/BSC only needs to retrieve the relevant CRRM information according to the previously explained procedures, and check if said Neighbour cell is suited for the specific UE.

When instead performing load management, and therefore when trying to evaluate whether a certain user could be shifted from a Serving cell to a Neighbouring cell, the SRNC/BSC can retrieve and compare CRRM information for Serving and Neighbouring cells for the specific cell change.

Before performing a Directed Retry, the SRNC/BSC should also compare CRRM information of the different possible target cells for the specific user request.

An RNC/BSC can also evaluate its own Cell Availabilities for RRM purposes (e.g. load management, mobility management, CAC, . . . ). In this sense, the same method used for CRRM can be used for RRM. For CAC for example, Cell Availabilities are a CAC-estimation that if up to date can substitute CAC algorithms in all the non-critical cases.

Regarding the way how the RNC/BSC determines the Cell Availabilities, a method is depicted in the following. In CAC functions the RNC/BSC uses specific input parameters like: load of specific services, knowledge on available capacities for different purposes, provided QoS, specific thresholds and other CAC input parameters. Based on these specific inputs, the CAC in the RNC/BSC is theoretically able to determine the "Cell Availabilities IE" for its cells as an output. However, the expense in terms of CAC processing might be high, and the precision that normal CAC algorithms can give is not needed for Cell Availabilities, that is only an estimation that needs to be valid for a number of seconds. Considering the above, it is therefore proposed to determine Cell Availabilities in the following manner: a CAC-like algorithm is used for which a certain configuration of a sufficient number of input values directly corresponds to a predefined configuration of the "Cell Availabilities IE". In this manner, all the needed information is set during configuration, and when estimation of Cell Availabilities is required, the RNC/BSC only has to use a subset of system/vendor specific input parameters to retrieve the corresponding configuration of Cell Availabilities that is then understood by any standard-compliant implementation.

A simplified example of the proposed method for determination of Cell Availabilities is given for UMTS FDD, assuming that the only input parameter that is needed is a vendor-specific DL Load (downlink load): the CAC-like algorithm determines that if (0.8<=DL Load<0.9) then Cell Availabilities are given by the pre-configured table in Appendix 5.

REASONABLE EXTENSIONS OF SCOPE

In the previously outlined description of an Embodiment Of The Invention, only UTRAN and GERAN A/Gb mode have been considered. However, the invention is easily extendible to GERAN Iu mode, as the same procedures used for CRRM between UTRAN nodes could be used between GERAN and UTRAN and between GERAN nodes. In this cases the interface that would be used is the Iur-g, where the same procedures of Iur would need to be defined.

Being in the scope of CRRM, the proposed solution must be able to cope with different technologies: this is the reason why the invention is described by making use of two main systems: GSM and UMTS. However, the considered issues would be equally reflected when considering inter-operation with other systems like cdma-2000, FOMA, WLAN systems and others: i.e. the description of the available bearer services would make it possible to achieve coordination among these systems.

Even if the presented examples refer to the Rel5 functional model architecture where the CRRM entity is implemented in every RNC/BSC, the invention is also applicable to centralised architectures, where CRRM information including Cell Availabilities are provided from different RRM entities to a centralised CRRM entity. Based on these descriptions the CRRM entity would then be in the position to direct a user towards the most suited radio access. This configuration is suited for possible future evolved RAN architectures with centralised CRRM.

APPENDIX 1

Detail of the UTRAN Cell Availabilities IE

| IE/Group Name Cell Availabilities | Presence | Range | IE type and reference | Semantics description |
|---|---|---|---|---|
| > Conversational Bearer Service Availability | O | | Bearer Service Availability | It indicates the estimated availability for Conversational bearer services in the cell. |
| > Streaming Bearer Service Availability | O | | Bearer Service Availability | It indicates the estimated availability for Streaming bearer services in the cell. |
| > Streaming HSDPA Bearer Service | O | | Bearer Service Availability | It indicates the estimated availability for Streaming HSDPA |

APPENDIX 1-continued

Detail of the UTRAN Cell Availabilities IE

| IE/Group Name Cell Availabilities | Presence | Range | IE type and reference | Semantics description |
|---|---|---|---|---|
| Availability | | | | bearer services in the cell. |
| > Interactive Bearer Service Availability | O | | Bearer Service Availability | It indicates the estimated availability for Interactive bearer services in the cell. |
| > Interactive HSDPA Bearer Service Availability | O | | Bearer Service Availability | It indicates the estimated availability for Interactive HSDPA bearer services in the cell. |
| > Background Bearer Service Availability | O | | Bearer Service Availability | It indicates the estimated availability for Background bearer services in the cell. |
| > Background HSDPA Bearer Service Availability | O | | Bearer Service Availability | It indicates the estimated availability for Background HSDPA bearer services in the cell. |

APPENDIX 2

Detail of the GERAN Cell Availabilities IE

| IE/Group Name Cell Availabilities | Presence | Range | IE type and reference | Semantics description |
|---|---|---|---|---|
| > Conversational Bearer Service Availability | O | | Bearer Service Availability | It indicates the estimated availability for Conversational bearer services in the cell. |
| > Conversational HSCSD Bearer Service Availability | O | | Bearer Service Availability | It indicates the estimated availability for Conversational HSCSD bearer services in the cell. |
| > Conversational ECSD Bearer Service Availability | O | | Bearer Service Availability | It indicates the estimated availability for Conversational ECSD bearer services in the cell. |
| > Streaming Bearer Service Availability | O | | Bearer Service Availability | It indicates the estimated availability for Streaming bearer services in the cell. |
| > Streaming EGPRS Bearer Service Availability | O | | Bearer Service Availability | It indicates the estimated availability for Streaming EGPRS bearer services in the cell. |
| > Interactive Bearer Service Availability | O | | Bearer Service Availability | It indicates the estimated availability for Interactive bearer services in the cell. |
| > Interactive EGPRS Bearer Service Availability | O | | Bearer Service Availability | It indicates the estimated availability for Interactive EGPRS bearer services in the cell. |
| > Background Bearer Service Availability | O | | Bearer Service Availability | It indicates the estimated availability for Background bearer services in the cell. |
| > Background EGPRS Bearer Service Availability | O | | Bearer Service Availability | It indicates the estimated availability for Background EGPRS bearer services in the cell. |

APPENDIX 3

| | | | Detail of the Bearer Service Availability IE | |
|---|---|---|---|---|
| IE/Group Name | Presence | Range | IE type and reference | Semantics description |
| Bearer Service Availability | | 1 to <maxnoofBSA> | | |
| > Link Reference | M | | INTEGER (1, 2, 3) | The specified bearer service refers to: 1: UL 2: DL 3: UL and DL |
| > Cell Change Reason | O | | INTEGER (1, 2) | 1: any (default). 2: restricted: other reasons than load/traffic reasons or Directed Retry: i.e. soft handover or cell changes that are necessary for maintaining an existing connection. |
| > Maximum Bearer Service Bitrate | M | | INTEGER (0...10, ...) | 0: this bearer service cannot currently be provided. 1...10: for values ranging from 1 to 10, the respective Bitrate Value in Table x approximately indicates the maximum bitrate that can currently be provided on the specified bearer service to a single user for cell changes of the specified Cell Change Reason. See Note1. |
| > Bearer Service Number Indication | O | | INTEGER (1...2) | It gives indication of the number of users to which the specified bearer service could be provided: 1: a few 2: many |

| Range bound | Explanation |
|---|---|
| maxnoofBSA | Number of Bearer Service Availability information provided for the same cell. It is 1 in case the information is provided together for UL and DL. It is 2 in case UL and DL are provided separately. |

APPENDIX 4

Mapping of Maximum Bearer Service Bitrate and Bitrate Value

| Maximum Bearer Service Bitrate | Bitrate Value (kbit/s) |
| --- | --- |
| 1 | 8 |
| 2 | 16 |
| 3 | 32 |
| 4 | 64 |
| 5 | 128 |
| 6 | 256 |
| 7 | 384 |
| 8 | 516 |
| 9 | 750 |
| 10 | 1000 |

APPENDIX 5

Example of practical cases of Cell Availabilities for UMTS FDD

| Cell Availabilities | |
| --- | --- |
| > Conversational Bearer Service Availability | Link ref: UL and DL<br>Cell Change Reason: restricted<br>Max Bearer Service Bitrate: 64k<br>Number Indication: a few |
| > Streaming Bearer Service Availability | Link ref: UL and DL<br>Cell Change Reason: restricted<br>Max Bearer Service Bitrate: 64k<br>Number Indication: a few |
| > Streaming HSDPA Bearer Service Availability | Link ref: DL<br>Cell Change Reason: restricted<br>Max Bearer Service Bitrate: 128k<br>Number Indication: a few |
| > Interactive Bearer Service Availability | Link ref: UL and DL<br>Cell Change Reason: restricted<br>Max Bearer Service Bitrate: 16k<br>Number Indication: a few |
| > Interactive HSDPA Bearer Service Availability | Link ref: DL<br>Cell Change Reason: restricted<br>Max Bearer Service Bitrate: 64k<br>Number Indication: a few |
| > Background Bearer Service Availability | Link ref: UL and DL<br>Max Bearer Service Bitrate: unavailable |
| > Background HSDPA Bearer Service Availability | Link ref: UL and DL<br>Max Bearer Service Bitrate: unavailable |

APPENDIX 6

List of the most relevant acronyms and a brief functional description.

| Term | Explanation |
| --- | --- |
| A | Interface among MSC and BSC |
| A-bis | Interface among BTS and BSC. |
| BSC | Base Station Controller: GERAN node where the main controlling functions are placed. |
| BSS | Base Station Subsystem, characterises a part of a RAN of the 'GSM' RAT consisting of one BSC and some BTS. |
| BSSGP | Signalling protocol over Gb. It implements RIM procedures. |
| BSSMAP | Signalling protocol over A. |
| BTS | Base Transceiver Station: the GSM node where antennas are placed. |
| CAC | Call Admission Control function. |
| cell | Radio access coverage unit. Main cell properties are:<br>Used radio access<br>Geographical location<br>Size, e.g.: macro, micro, pico |
| CN | Core Network, it interfaces towards UTRAN and GERAN from MSC and SGSN nodes. |
| CRRM | Common RRM: it describes RRM functionalities that consider cells of the same or other radio accesses homogeneously. If efficiently designed and implemented, this functionality allows the operator to manage its PLMN radio resources of different RATs and modes as a single radio resource pool. |
| DR | Directed Retry, initial access cell change at call setup |
| DRNC | Drift RNC |
| ECSD | Enhanced Circuit Switched Data. It makes use of multi-slot capability and EDGE. It is one kind of Radio Access. |
| E-DCH | Enhanced Dedicated transport Channel - foreseen high bitrate uplink channel in UTRAN, that would be able to use techniques similar to those used by HSDPA. Foreseen for Re17. It is one kind of Radio Access. |
| EDGE | Enhanced Data rates for GSM Evolution: new techniques that allow higher data rates in GSM, e.g. higher modulations. |
| EGPRS | Enhanced GPRS. It uses EDGE. It is one kind of Radio Access. |
| EUDTCH | Enhanced Uplink Dedicated Transport Channel. It is the name of the Study Item for the design of E-DCH. |
| FDD | Frequency Division Duplex, a UTRAN mode. It is one kind of Radio Access. |
| Gb | Interface between BSC and SGSN |
| GERAN | GSM EDGE RAN: the ultimate GSM RAN |
| GPRS | General Packet Radio Service. It is one kind of Radio Access. |
| GSM | Global System for Mobile communications |
| HO | Handover, the transfer of a user's connection from one radio channel to another |
| HSCSD | High Speed Circuit Switched Data: GSM technique that allows the user to access more than one TS at a time for Circuit Switched Data purposes (multi-slot capability). It is one kind of Radio Access. |
| HSDPA | High Speed Downlink Packet Access: UTRAN radio access that achieves high bitrates through usage of specific techniques such as higher modulations, scheduling and retransmission schemes. It is one kind of Radio Access. |
| Iu | Interface between SGSN and RNC, or between MSC and RNC. |
| Iub | Interface between RNC and Node-B. |
| Iur | Interface between two RNCs. |
| load | Generic concept of radio resources occupancy. |
| MIMO | Multiple Input - Multiple Output: UMTS technique foreseen for Re16 or Re17 that could improve cell capacity by usage of multiple antennas at the transmitting and receiving entities. It is one kind of Radio Access. |
| MS | Mobile Station: generic term to reference a mobile terminal in GSM. For multi-mode terminals that can access both UTRAN and GERAN, either UE, MS or UE/MS are used with the same meaning. |
| MSC | Mobile Switching Centre: CN node that interfaces with RAN for circuit switched services. |
| Node-B | The UTRAN node where antennas are placed. |
| NRT | Non Real Time: it references Interactive or Background traffic classes. |

APPENDIX 6-continued

List of the most relevant acronyms and a brief functional description.

| Term | Explanation |
|---|---|
| O&M | Operation & Management: network node where the operator has centralised access, specially for configuration and network failures management. |
| PLMN | Public Land Mobile Network: the generic multi-RAT network of an operator. |
| RAB | Radio Access Bearer: generic name in UTRAN for the bearer service from the CN to the UE |
| Radio Access | We use it as a generic term for identifying a specific combination of RAT and radio access mode or option, or a particular access technology. |
| Radio Access Mode | Different modes for the same RAT, e.g.: FDD and TDD for UTRA. TDDLCR and TDDHCR are different options for TDD. |
| RAN | Radio Access Network, a system providing mobile access through coordination of a number of cells, e.g.: UTRAN, GERAN. |
| RANAP | Signalling protocol over Iu |
| RAT | Radio Access Technology, type of technology used for radio access, e.g.: GSM, UTRA, cdma2000, etc. One RAT can have different radio access modes. |
| RB | Radio Bearer: generic name in UTRAN for the bearer service from the RNC to the UE |
| RIM | RAN Information Management: set of procedures that enables communication among different RAN controllers. RIM support between GERAN and UTRAN is foreseen for Re16 or Re17. |
| RL | Radio Link: a logical association between a single UE and a single UTRAN access point. Its physical realisation comprises one or more radio bearer transmissions. |
| RNC | Radio Network Controller: UTRAN node where the main controlling functions are placed. |
| RNSAP | Signalling protocol over Iur |
| RRC | Radio Resource Control: BSC or RNC entity that interfaces towards the UE and that is responsible for a number of RRC functions. |
| RRM | Radio Resource Management function: a generic term that comprises a number of functions for management of UE rardio resources as well as cell radio resources. It includes handover/cell re-selection functions, load management, Directed Retry and others. |
| RT | Real Time: it references Conversational or Streaming traffic classes. |
| SGSN | Serving GPRS Support Node: CN node that interfaces with RAN for packet switched services. |
| SRNC | Serving RNC: the RNC that is responsible for controlling the UE, and that has the link towards the CN for that UE. |
| TDDHCR | Time Division Duplex, High Chip Rate: one mode and one option of UTRAN. It is one kind of Radio Access. |
| TDDLCR | Time Division Duplex, Low Chip Rate: one mode and one option of UTRAN. It is one kind of Radio Access. |
| TS | Time Slot: typical resource unit for GSM and TDD radio accesses. |
| UE | User Equipment: generic term to reference a mobile terminal in UMTS. For multi-mode terminals that can access both UTRAN and GERAN, either UE, MS or UE/MS are used with the same meaning. |
| Um | Interface among GERAN and MS. |
| UMTS | Universal Mobile Telecommunication System. |
| UTRAN | UMTS Terrestrial RAN: the UMTS RAN. |
| WLAN | Wireless Local Area Network: a system that in the near future could be a competitor of UMTS/GSM systems. |
| DL | Downlink |
| FOMA | Freedom Of Mobile multimedia Access: 3G wireless telecommunication system in use in Japan. |
| UL | Uplink |
| Uu | Interface among UTRAN and UE. |

A complete set of definitions can be found in 3GPP TR 21.905.

The invention claimed is:

1. A method for common radio resource management in a mobile radio communication network employing different radio access technologies that overlap over a geographic area and which are subdivided into cells belonging to domains of controllers which are connected to each other in overlapping or adjacent domains and to a core network by means of relevant interfaces, the method being suitable to be carried out for each controlled cell by the respective controller through the following method step:

a) starting from acquired information about Qos and throughput of all active connections with served mobile terminals, calculating traffic-related Information Elements, separately for uplink and downlink, for use in planning at least one of handovers and cell reselections;

b) including said Information Elements in management messages forwarded to the controllers of different cells and to one considered either of a same or different technology; and c) checking said Information Elements coming from other controllers in order to decide either of issuing or preventing at least one handovers and cell reselection commands towards a neighboring cell;

wherein the traffic-related Information Elements include indications of bearer services availability in the cell in terms of a maximum bearer services bitrate, either guaranteed or not guaranteed, that can currently be provided for a given bearer service, and wherein the maximum bear service bitrate indicates whether a bear services is currently unavailable; and wherein the bear services availability is subdivided into the following standardized Quality of Service classes, the classes including: Conversational, Streaming, Interactive, and Background.

2. The method according to claim 1, wherein the bearer service availability subdivided into Quality of Service classes is further subdivided into radio access technology types.

3. The method according to claim 1, wherein the bearer service availability subdivided into Quality of Service classes and radio access technology types is further subdivided into sub-technologies.

4. The method of the claim 1, wherein the radio access technology comprises UTRA.

5. The method according to claim 1, wherein an employed sub-technology comprises HSDPA that is used by all bearer service availability classes other than Conversational.

6. The method according to claim 1, wherein radio access technology comprises GERAN.

7. The method according to claim 1, wherein an employed sub-technology comprises HSCSD that is used by a Conversational class of bearer service availability.

8. The method according to claim 1, wherein an employed sub-technology comprises ECSD that is used by a Conversational class of bearer service availability.

9. The method according to claim 1, wherein an employed sub-technology comprises EGPRS that is used by a Streaming class of bearer service availability.

10. The method according to claim 1, wherein an employed sub-technology comprises EGPRS that is used by an Interactive class of bearer service availability.

11. The method according to claim 1, wherein an employed sub-technology comprises EGPRS that is used by a Background class of bearer service availability.

12. The method according to claim 1, wherein maximum guaranteed/unguaranteed bitrate that can currently be allowed to each bearer service is indicated by an integer number having values in a given range from zero to a maximum value, the value indicating either total unavailability or maximum permissible bitrate for that type of bearer service.

13. The method according to claim 1, wherein said bearer service availability indication includes a number of bearer services of specified bitrate that can be provided in the cell.

14. The method according to claim 1, wherein said bearer service availability indication includes a specification of Cell Change Reason for which bearer services can be provided in the cell.

* * * * *